United States Patent
Khoshnevisan et al.

(10) Patent No.: US 12,355,700 B2
(45) Date of Patent: Jul. 8, 2025

(54) TECHNIQUES FOR SINGLE FREQUENCY NETWORK SOUNDING REFERENCE SIGNAL TRANSMISSION

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/868,627

(22) Filed: Jul. 19, 2022

(65) Prior Publication Data

US 2024/0031098 A1    Jan. 25, 2024

(51) Int. Cl.
*H04L 5/00* (2006.01)
*H04W 72/1268* (2023.01)
*H04W 72/20* (2023.01)

(52) U.S. Cl.
CPC ....... *H04L 5/0051* (2013.01); *H04W 72/1268* (2013.01); *H04W 72/20* (2023.01)

(58) Field of Classification Search
CPC ..... H04W 72/12; H04W 72/20; H04W 72/21; H04W 72/23; H04W 72/231; H04W 72/232; H04W 72/1263; H04W 72/1268; H04W 72/1273; H04W 74/0833; H04W 74/0841; H04W 24/10; H04W 52/146; H04L 5/0048; H04L 5/005; H04L 5/0051; H04L 5/0053; H04L 5/0094; H04L 1/0026

See application file for complete search history.

(56) References Cited

U.S. PATENT DOCUMENTS

2021/0044385 A1* 2/2021 Hosseini ............... H04L 1/08
2022/0278795 A1* 9/2022 Go ........................ H04B 7/0408

* cited by examiner

*Primary Examiner* — Peter Chen
(74) *Attorney, Agent, or Firm* — Holland & Hart LLP

(57) ABSTRACT

Methods, systems, and devices for wireless communications are described. A user equipment (UE) may receive, from a network entity, first control signaling indicating a single frequency network (SFN) configuration associated with a first sounding reference signal (SRS) resource of an SRS resource set, where the SFN configuration indicates multiple sets of transmission parameters for SFN transmissions associated with the first SRS resource. The UE may then transmit an SRS associated with the first SRS resource in accordance with a first set of transmission parameters indicated by the SFN configuration. The UE may further transmit the SRS associated with the first SRS resource in accordance with a second set of transmission parameters indicated by the SFN configuration.

28 Claims, 15 Drawing Sheets

TECHNIQUES FOR SINGLE FREQUENCY NETWORK SOUNDING REFERENCE SIGNAL TRANSMISSION

FIELD OF TECHNOLOGY

The following relates to wireless communications, including techniques for single frequency network (SFN) sounding reference signal (SRS) transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for single frequency network (SFN) sounding reference signal (SRS) transmission. Generally, aspects of the present disclosure support techniques for transmitting SRSs in an SFN configuration, in which an SRS resource set can be associated with multiple sets of transmit (Tx) parameters. For example, a user equipment (UE) may receive an SFN configuration for an SRS resource set, where the SFN configuration indicates multiple sets of Tx parameters for the SRS set. The UE may then transmit an SRS associated with a single SRS resource of the SRS set, where the SRS is transmitted using multiple sets of Tx parameters (e.g., via multiple beams, using multiple precoders, multiple sets of power control parameters, etc.). For instance, an SRS associated with a first SRS resource of the SRS resource set may be transmitted via a first antenna panel using a first set of Tx parameters, and via a second antenna panel via a second set of Tx parameters. In some cases, each SRS resource of an SRS set may be transmitted in an SFN manner. In other cases, the SFN configuration may apply to only some SRS resources of an SRS resource set. Upon receiving an SRS transmitted according to multiple sets of transmit parameters, the network may schedule the UE to transmit an uplink message in an SFN manner using the multiple sets of Tx parameters that were used to transmit the SRS.

A method is described. The method may include receiving, from a network entity, first control signaling indicating an SFN configuration associated with a first SRS resource of an SRS resource set, the SFN configuration indicating a set of multiple sets of transmission parameters for SFN transmissions associated with the first SRS resource, transmitting an SRS associated with the first SRS resource in accordance with a first set of transmission parameters indicated by the SFN configuration, and transmitting the SRS associated with the first SRS resource in accordance with a second set of transmission parameters indicated by the SFN configuration.

An apparatus is described. The apparatus may include a processor, memory coupled with the processor, and instructions stored in the memory. The instructions may be executable by the processor to cause the apparatus to receive, from a network entity, first control signaling indicating an SFN configuration associated with a first SRS resource of an SRS resource set, the SFN configuration indicating a set of multiple sets of transmission parameters for SFN transmissions associated with the first SRS resource, transmit an SRS associated with the first SRS resource in accordance with a first set of transmission parameters indicated by the SFN configuration, and transmit the SRS associated with the first SRS resource in accordance with a second set of transmission parameters indicated by the SFN configuration.

Another apparatus is described. The apparatus may include means for receiving, from a network entity, first control signaling indicating an SFN configuration associated with a first SRS resource of an SRS resource set, the SFN configuration indicating a set of multiple sets of transmission parameters for SFN transmissions associated with the first SRS resource, means for transmitting an SRS associated with the first SRS resource in accordance with a first set of transmission parameters indicated by the SFN configuration, and means for transmitting the SRS associated with the first SRS resource in accordance with a second set of transmission parameters indicated by the SFN configuration.

A non-transitory computer-readable medium storing code is described. The code may include instructions executable by a processor to receive, from a network entity, first control signaling indicating an SFN configuration associated with a first SRS resource of an SRS resource set, the SFN configuration indicating a set of multiple sets of transmission parameters for SFN transmissions associated with the first SRS resource, transmit an SRS associated with the first SRS resource in accordance with a first set of transmission parameters indicated by the SFN configuration, and transmit the SRS associated with the first SRS resource in accordance with a second set of transmission parameters indicated by the SFN configuration.

Some examples of the method, apparatuses, and non-transitory computer-readable medium described herein may further include operations, features, means, or instructions for transmitting a second SRS associated with a second SRS resource of the set of multiple SRS resources in accordance with the first set of transmission parameters of the set of multiple sets of transmission parameters based on the SFN configuration and transmitting the second SRS associated with the second SRS resource in accordance with the second set of transmission parameters of the set of multiple sets of transmission parameters based on the SFN configuration.

In some examples of the method, apparatuses, and non-transitory computer-readable medium described herein, and the method, apparatuses, and non-transitory computer-readable medium may include further operations, features, means, or instructions for transmitting a second SRS associated with the second SRS resource in accordance with one of the first set of transmission parameters or the second set of transmission parameters.

Some examples of the method, apparatuses, and non-transitory computer-readable medium described herein may further include operations, features, means, or instructions for receiving, via the first control signaling, an indication of one or more channel state information (CSI) reference signal (CSI-RS) resources associated with the SRS resource set, where transmitting the SRS may be based on the one or more CSI-RS resources.

Some examples of the method, apparatuses, and non-transitory computer-readable medium described herein may further include operations, features, means, or instructions for transmitting the SRS in accordance with a first precoder that may be based on the one or more CSI-RS resources, where the first set of transmission parameters include the first precoder and transmitting the SRS in accordance with a second precoder that may be based on the one or more CSI-RS resources, where the second set of transmission parameters include the second precoder.

Some examples of the method, apparatuses, and non-transitory computer-readable medium described herein may further include operations, features, means, or instructions for receiving second control signaling scheduling the SRS associated with the first SRS resource, where transmitting the SRS may be based on receiving the second control signaling.

Some examples of the method, apparatuses, and non-transitory computer-readable medium described herein may further include operations, features, means, or instructions for receiving, via the second control signaling, an indication of a first transmission configuration indicator (TCI) state and a second TCI state, where the first set of transmission parameters includes the first TCI state, and where the second set of transmission parameters includes the second TCI state.

Some examples of the method, apparatuses, and non-transitory computer-readable medium described herein may further include operations, features, means, or instructions for receiving, from the network entity based on the SRS, second control signaling scheduling an uplink message associated with the first SRS resource, transmitting the uplink message in accordance with the first set of transmission parameters based on the second control signaling and the SFN configuration, and transmitting the uplink message in accordance with the second set of transmission parameters based on the second control signaling and the SFN configuration.

Some examples of the method, apparatuses, and non-transitory computer-readable medium described herein may further include operations, features, means, or instructions for transmitting the uplink message via a first antenna panel in accordance with the first set of transmission parameters and transmitting the uplink message via a second antenna panel in accordance with the second set of transmission parameters.

Some examples of the method, apparatuses, and non-transitory computer-readable medium described herein may further include operations, features, means, or instructions for receiving, via the second control signaling, an SRS resource indicator (SRI) associated with the first SRS resource, where transmitting the uplink message may be based on the SRI.

Some examples of the method, apparatuses, and non-transitory computer-readable medium described herein may further include operations, features, means, or instructions for receiving, via the second control signaling, a transmit precoding matrix indicator (TPMI) associated with the uplink message, where the uplink message may be transmitted in accordance with the TPMI.

Some examples of the method, apparatuses, and non-transitory computer-readable medium described herein may further include operations, features, means, or instructions for transmitting the SRS via a first antenna panel in accordance with the first set of transmission parameters and transmitting the SRS via a second antenna panel in accordance with the second set of transmission parameters.

In some examples of the method, apparatuses, and non-transitory computer-readable medium described herein, the SRS transmitted via a first antenna panel may be transmitted to a first transmission reception point associated with the network entity and the SRS transmitted via a second antenna panel may be transmitted to a second transmission reception point associated with the network entity.

In some examples of the method, apparatuses, and non-transitory computer-readable medium described herein, the first set of transmission parameters, the second set of transmission parameters, or both, include a transmit beam, a TCI state, a precoder, a power control parameter, or any combination thereof.

A method for wireless communication at a network entity is described. The method may include transmitting, to a user equipment (UE), first control signaling indicating an SFN configuration associated with a first SRS resource of an SRS resource set, the SFN configuration indicating a set of multiple sets of transmission parameters for SFN transmissions associated with the first SRS resource, receiving, from the UE, an SRS associated with the first SRS resource in accordance with a first set of transmission parameters indicated by the SFN configuration, and receiving, from the UE, the SRS associated with the first SRS resource in accordance with a second set of transmission parameters indicated by the SFN configuration.

An apparatus for wireless communication at a network entity is described. The apparatus may include a processor, memory coupled with the processor, and instructions stored in the memory. The instructions may be executable by the processor to cause the apparatus to transmit, to a UE, first control signaling indicating an SFN configuration associated with a first SRS resource of an SRS resource set, the SFN configuration indicating a set of multiple sets of transmission parameters for SFN transmissions associated with the first SRS resource, receive, from the UE, an SRS associated with the first SRS resource in accordance with a first set of transmission parameters indicated by the SFN configuration, and receive, from the UE, the SRS associated with the first SRS resource in accordance with a second set of transmission parameters indicated by the SFN configuration.

Another apparatus for wireless communication at a network entity is described. The apparatus may include means for transmitting, to a UE, first control signaling indicating an SFN configuration associated with a first SRS resource of an SRS resource set, the SFN configuration indicating a set of multiple sets of transmission parameters for SFN transmissions associated with the first SRS resource, means for receiving, from the UE, an SRS associated with the first SRS resource in accordance with a first set of transmission parameters indicated by the SFN configuration, and means for receiving, from the UE, the SRS associated with the first SRS resource in accordance with a second set of transmission parameters indicated by the SFN configuration.

A non-transitory computer-readable medium storing code for wireless communication at a network entity is described. The code may include instructions executable by a processor to transmit, to a UE, first control signaling indicating an SFN configuration associated with a first SRS resource of an SRS resource set, the SFN configuration indicating a set of multiple sets of transmission parameters for SFN transmissions associated with the first SRS resource, receive, from the UE, an SRS associated with the first SRS resource in accordance with a first set of transmission parameters indicated by the SFN configuration, and receive, from the UE, the SRS associated with the first SRS resource in accordance with a second set of transmission parameters indicated by the SFN configuration.

In some examples of the method, apparatuses, and non-transitory computer-readable medium described herein, the SFN configuration may be associated with a set of multiple SRS resources of the SRS resource set and the method, apparatuses, and non-transitory computer-readable medium may include further operations, features, means, or instructions for receiving a second SRS associated with a second SRS resource of the set of multiple SRS resources in accordance with the first set of transmission parameters of the set of multiple sets of transmission parameters based on the SFN configuration and receiving the second SRS associated with the second SRS resource in accordance with the second set of transmission parameters of the set of multiple sets of transmission parameters based on the SFN configuration.

In some examples of the method, apparatuses, and non-transitory computer-readable medium described herein, the SRS resource set includes at least the first SRS resource and a second SRS resource and the method, apparatuses, and non-transitory computer-readable medium may include further operations, features, means, or instructions for receiving a second SRS associated with the second SRS resource in accordance with one of the first set of transmission parameters or the second set of transmission parameters.

Some examples of the method, apparatuses, and non-transitory computer-readable medium described herein may further include operations, features, means, or instructions for transmitting, via the first control signaling, an indication of one or more CSI-RS resources associated with the SRS resource set, where receiving the SRS may be based on the one or more CSI-RS resources.

Some examples of the method, apparatuses, and non-transitory computer-readable medium described herein may further include operations, features, means, or instructions for receiving the SRS in accordance with a first precoder that may be based on the one or more CSI-RS resources, where the first set of transmission parameters include the first precoder and receiving the SRS in accordance with a second precoder that may be based on the one or more CSI-RS resources, where the second set of transmission parameters include the second precoder.

Some examples of the method, apparatuses, and non-transitory computer-readable medium described herein may further include operations, features, means, or instructions for transmitting, to the UE, second control signaling scheduling the SRS associated with the first SRS resource, where receiving the SRS may be based on transmitting the second control signaling.

Some examples of the method, apparatuses, and non-transitory computer-readable medium described herein may further include operations, features, means, or instructions for transmitting, via the second control signaling, an indication of a first TCI state and a second TCI state, where the first set of transmission parameters includes the first TCI state, and where the second set of transmission parameters includes the second TCI state.

Some examples of the method, apparatuses, and non-transitory computer-readable medium described herein may further include operations, features, means, or instructions for transmitting, to the UE based on the SRS, second control signaling scheduling an uplink message associated with the first SRS resource, receiving the uplink message in accordance with the first set of transmission parameters based on the second control signaling and the SFN configuration, and receiving the uplink message in accordance with the second set of transmission parameters based on the second control signaling and the SFN configuration.

Some examples of the method, apparatuses, and non-transitory computer-readable medium described herein may further include operations, features, means, or instructions for receiving the uplink message via a first antenna panel in accordance with the first set of transmission parameters and receiving the uplink message via a second antenna panel in accordance with the second set of transmission parameters.

Some examples of the method, apparatuses, and non-transitory computer-readable medium described herein may further include operations, features, means, or instructions for transmitting, via the second control signaling, an SRI associated with the first SRS resource, where receiving the uplink message may be based on the SRI.

Some examples of the method, apparatuses, and non-transitory computer-readable medium described herein may further include operations, features, means, or instructions for transmitting, via the second control signaling, a TPMI associated with the uplink message, where the uplink message may be received in accordance with the TPMI.

Some examples of the method, apparatuses, and non-transitory computer-readable medium described herein may further include operations, features, means, or instructions for receiving the SRS in accordance with the first set of transmission parameters via a first transmission reception point and receiving the SRS in accordance with the second set of transmission parameters via a second transmission reception point.

In some examples of the method, apparatuses, and non-transitory computer-readable medium described herein, the first set of transmission parameters, the second set of transmission parameters, or both, include a transmit beam, a TCI state, a precoder, a power control parameter, or any combination thereof.

DETAILED DESCRIPTION

Figure 1:
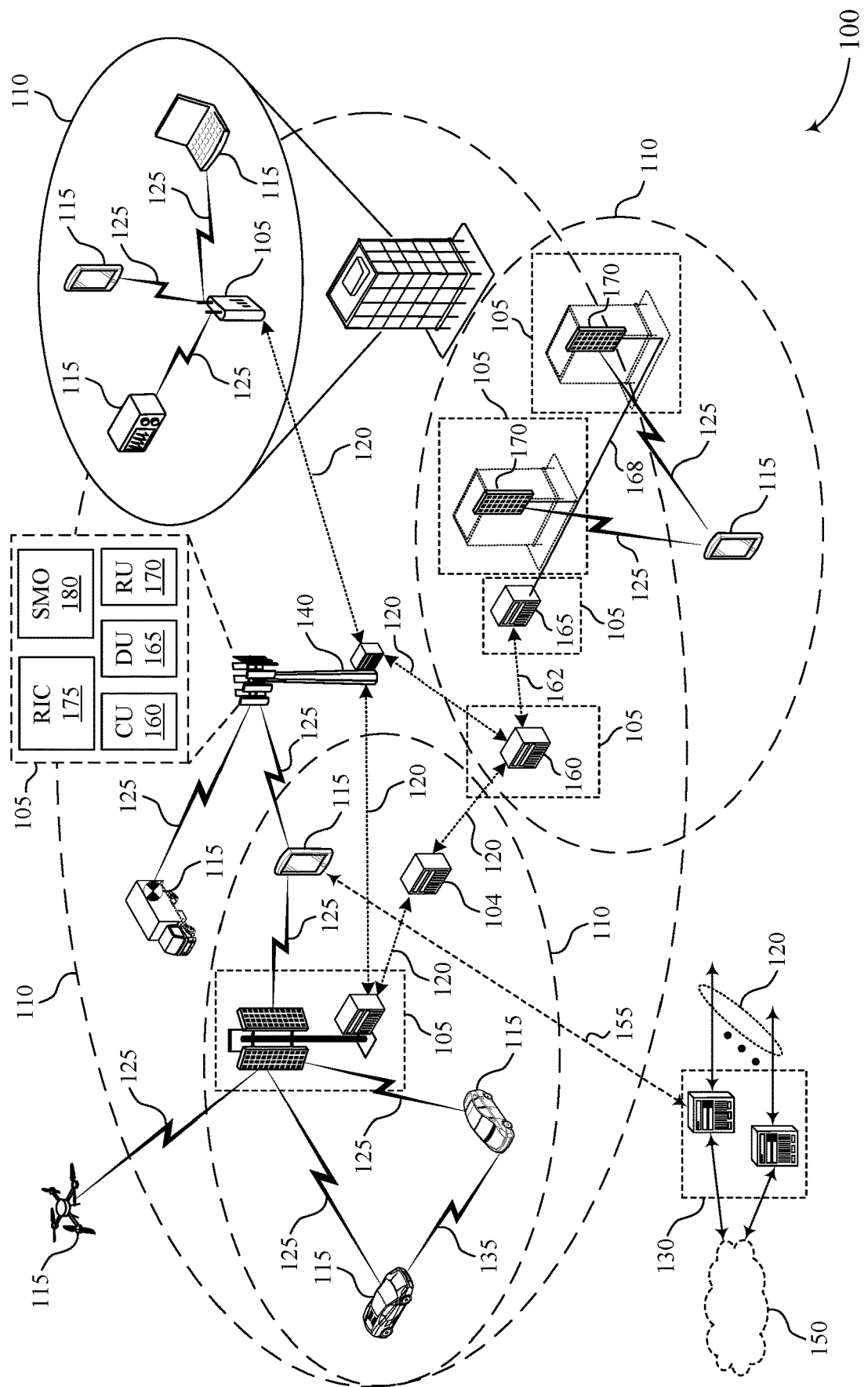
FIG. 1 illustrates an example of a wireless communications system that supports techniques for single frequency network (SFN) sounding reference signal (SRS) transmission in accordance with one or more aspects of the present disclosure.

Some wireless systems may enable wireless devices to transmit multiple repetitions of the same message. Transmitting multiple repetitions of the same message may improve robustness and reliability of signaling. Moreover, some wireless devices may transmit multiple repetitions of the same message using different beams or transmit (Tx) parameters (e.g., different transmission configuration indicator (TCI) states) to increase link diversity and further improve robustness and reliability. For example, a single downlink control information (DCI) message may schedule four repetitions of the same payload, where a first pair of repetitions are to be transmitted using a first beam (e.g., first TCI state, first set of Tx parameters) and the second pair of repetitions are to be transmitted using a second beam (e.g., second TCI state, second set of Tx parameters). In such cases, each pair of repetitions is associated with a respective sounding reference signal (SRS) set (e.g., two separate SRS sets), where each SRS set is associated with a respective set of Tx parameters (e.g., first set of Tx parameters for first SRS set, second set of Tx parameters for second SRS set). However, this requires the scheduling DCI message to indicate multiple sets of SRS resources, thereby increasing signaling overhead. Moreover, the use of multiple SRS sets to transmit repetitions of the same data payload may result in an inefficient use of resources.

Accordingly, aspects of the present disclosure are directed to techniques for transmitting SRSs in a single-frequency network (SFN) configuration, in which an SRS resource set can be associated with multiple sets of Tx parameters. For example, a user equipment (UE) may receive an SFN configuration for an SRS resource set, where the SFN configuration indicates multiple sets of Tx parameters for the SRS set. The UE may then transmit an SRS associated with a single SRS resource of the SRS set, where the SRS is transmitted using multiple sets of Tx parameters (e.g., via multiple beams, using multiple precoders, multiple TCI states). For instance, an SRS associated with a first SRS resource of the SRS resource set may be transmitted via a first antenna panel using a first set of Tx parameters, and via a second antenna panel via a second set of Tx parameters. In some cases, each SRS resource of an SRS set may be transmitted in an SFN manner. In other cases, the SFN configuration may apply to only some SRS resources of an SRS resource set. Upon receiving an SRS transmitted according to multiple sets of Tx parameters, the network may schedule the UE to transmit a PUSCH in an SFN manner using the multiple sets of Tx parameters that were used to transmit the SRS.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for SFN SRS transmission.

FIG. 1 illustrates an example of a wireless communications system 100 that supports techniques for SFN SRS transmission in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for SFN SRS transmission as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, UEs 115, network entities 105, and other wireless devices of the wireless communications system 100 may support techniques for transmitting SRSs in a SFN configuration, in which an SRS resource set can be associated with multiple sets of Tx parameters. In other words, the wireless communications system 100 may support SFNed SRS transmissions.

For example, a UE 115 of the wireless communications system 100 may receive control signaling (e.g., RRC message) indicating an SFN configuration for an SRS resource set, where the SFN configuration indicates multiple sets of Tx parameters for the SRS set. The UE 115 may then transmit an SRS associated with a single SRS resource of the SRS set, where the SRS is transmitted using multiple sets of Tx parameters (e.g., via multiple beams, using multiple precoders, multiple TCI states). For instance, the UE 115 may transmit an SRS associated with a first SRS resource of the SRS resource via a first antenna panel using a first set of Tx parameters, and via a second antenna panel via a second set of Tx parameters. In some cases, the SRS transmitted via the respective antenna panels may be transmitted to different transmission-reception points (TRPs) of a network entity 105.

In some implementations, each SRS resource of an SRS set may be transmitted in an SFN manner. In other words, the SFN configuration may apply to the entirety of the SRS set (e.g., SFN configuration is applied per-SRS set). In other cases, the SFN configuration may apply to only some SRS resources of an SRS resource set (e.g., SFN configuration is applied per-SRS resource). Upon receiving an SRS transmitted according to multiple sets of Tx parameters, the network entity 105 may schedule the UE 115 to transmit an uplink message (e.g., physical uplink shared channel (PUSCH) message) in an SFNed manner using the multiple sets of Tx parameters that were used to transmit the SRS. For instance, the UE 115 may transmit the uplink message via the first antenna panel using the first set of Tx parameters, and may additionally transmit the uplink message via the second antenna panel using the second set of Tx parameters.

Techniques described herein may enable UEs 115 to transmit SRSs in an SFNed manner. In other words, techniques described herein may enable wireless devices to transmit an SRS associated with the same SRS resource using multiple sets of Tx parameters (e.g., SFNed SRS). As such, techniques described herein may enable control messages (e.g., DCI messages) which schedule SFNed SRSs and/or uplink messages to indicate fewer sets of SRS resources while still enabling scheduled SRSs/uplink messages to be performed in accordance with multiple sets of Tx parameters, thereby decreasing signaling overhead used to schedule SRSs/uplink messages. Moreover, the use of a single SRS set (or SRS resource) to transmit SRSs and/or uplink messages in an SFN manner may result in more efficient use of resources within the wireless communications system 100.

Figure 2:
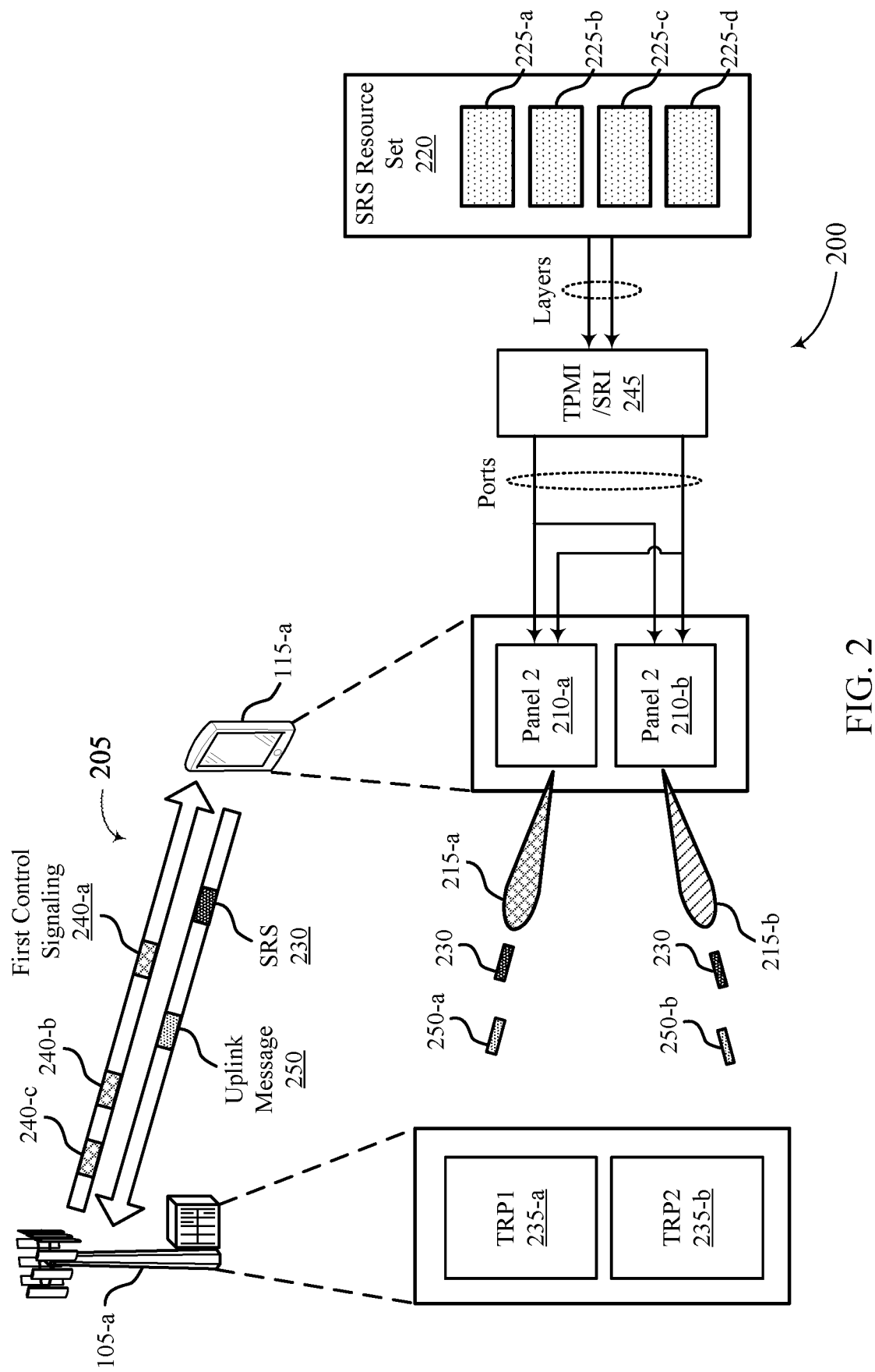
FIG. 2 illustrates an example of a wireless communications system that supports techniques for SFN SRS transmission in accordance with one or more aspects of the present disclosure.

FIG. 2 illustrates an example of a wireless communications system 200 that supports techniques for SFN SRS transmission in accordance with one or more aspects of the present disclosure. In some examples, aspects of the wireless communications system 200 may implement, or be implemented by, aspects of the wireless communications system 100. In particular, the wireless communications system 200 may support techniques that enable wireless devices to transmit an SRS associated with the same SRS resource using multiple sets of Tx parameters (e.g., enable SFNed SRS transmissions), as described with respect to FIG. 1.

The wireless communications system 200 may include a network entity 105-a and a UE 115-a. The UE 115-a may communicate with the network entity 105-a using a communication link 205, which may be an example of an NR or LTE link between the respective UE 115-a and the network entity 105-a. In some cases, the communication link 205 may include an example of an access link (e.g., Uu links) which may include a bi-directional link that enables both uplink and downlink communication. For example, the UE 115-a may transmit uplink signals, such as uplink control signals or uplink data signals, to one or more components of the network entity 105-a using the communication link 205, and one or more components of the network entity 105-a may transmit downlink signals, such as downlink control signals or downlink data signals, to the UE 115-a using the communication link 205.

Some wireless communications systems enable wireless devices, such as UEs 115, to transmit SRSs 230 to the network, where the SRSs 230 enable the network to perform channel estimation and improve the reliability of wireless communications. Wireless devices may transmit SRSs 230 according to one or more SRS resource sets 220, where each SRS resource set 220 includes one or more SRS resources 225. The "usage" for a given SRS resource set 220 may be configured for beam management, codebook, non-codebook, and antenna switching (e.g., Usage={beamManagement, codebook, nonCodebook, antennaSwitching}).

The codebook and non-codebook usage for an SRS resource set 220 is related to PUSCH scheduling and transmission. Some wireless communications systems may support two types of PUSCH transmission: (1) codebook-based transmission, and (2) non-codebook based transmission. In the context of codebook-based PUSCH transmission, the UE 115-a may be configured with only one SRS resource set 220 with usage set to codebook, where the UE 115-a may be configured with a maximum of four SRS resources 225 within the SRS resource set 220. The uplink DCI message scheduling a codebook-based PUSCH may include an SRS resource indicator (SRI) (e.g., SRI 245) field that indicates one SRS resource 225 for the codebook-based PUSCH. Moreover, the number of layers (e.g., rank) and transmit precoding matrix indicator (TPMI) (e.g., precoder) for the scheduled codebook-based PUSCH may be determined from a separate DCI field (e.g., field associated with precoding information and number of layers).

Similarly, in the context of non-codebook based PUSCH transmission, the UE 115-a may be configured with only one SRS resource set 220 with usage set to non-codebook. However, for non-codebook transmissions, the SRS resource set 220 may be optionally configured with an associated CSI-RS resource that is usable by the UE 115-a to precode the SRS transmissions within the indicated SRS resource set 220. For non-codebook transmissions, the UE 115-a may be configured with a maximum of four SRS resources 225 within the SRS resource set 220, where each SRS resource 225 is associated with one port. The uplink DCI message scheduling a non-codebook-based PUSCH may include an SRI field (e.g., SRI 245) that indicates one or multiple SRS resources 225 for the non-codebook-based PUSCH, where the number of indicated SRS resources 225 determines the rank (e.g., number of layers) for the scheduled PUSCH message. The non-codebook-based PUSCH message may be transmitted with the same precoder as the indicated SRS resources 225.

As noted previously herein, some wireless systems may enable wireless devices to transmit multiple repetitions of the same message. Transmitting multiple repetitions of the same message may improve robustness and reliability of signaling. Moreover, some wireless devices may transmit multiple repetitions of the same message using different beams or Tx parameters (e.g., different TCI states) to increase link diversity and further improve robustness and reliability. In such cases, the multiple repetitions of the same message/payload may be scheduled via the same control message (e.g., same DCI).

In other words, some wireless communications systems may support single-DCI based PUSCH repetition in TDM manner, where the scheduled repetitions correspond to different Tx parameters (e.g., different beams, different spatial relations, different TCI states, different power control parameters, different precoders). In such cases, repetitions a data message (e.g., PUSCH repetitions associated with the same TB) scheduled by a single DCI message may be associated with, or belong to, two sets of repetitions, where each set of repetitions is associated with its own antenna panel 210, beam 215, power control parameters, etc. To enable such single-DCI based PUSCH repetitions, the two sets of repetitions may correspond to two SRS resource sets 220, where the scheduling DCI indicates two SRI fields (e.g., two SRI 245 fields) corresponding to two respective beams 215 and two respective sets of power control parameters for both codebook based and non-codebook based PUSCH messaging. In the case of codebook-based PUSCH, the scheduling DCI message may also indicate two TPMI fields to indicate two precoders for the two sets of repetitions (e.g., first TPMI for first pair of PUSCH repetitions, second TPMI for second pair of PUSCH repetitions).

For example, referring to FIG. 2, the UE 115-a may receive a single DCI message (e.g., uplink DCI) from the network entity 105-a, where the DCI message schedules four repetitions of the same payload. In other words, the DCI may schedule four repetitions of the same PUSCH message. In this example, the UE 115-a may transmit a first pair of PUSCH repetitions (e.g., PUSCH repetitions #1 and #3) to a first TRP of the network entity 105-a using a first set of Tx parameters (e.g., first Tx beam 215-a, first set of uplink power control parameters). Conversely, the UE 115-a may transmit a second pair of PUSCH repetitions (e.g., PUSCH repetitions #2 and #4) to the network entity 105-a using a second set of Tx parameters (e.g., second Tx beam 215-b, second set of uplink power control parameters). In this example, the first pair of PUSCH repetitions (e.g., PUSCH repetitions #1 and #3) may be associated with a first SRS resource set 220 and may be transmitted by the UE 115-a using a first antenna panel 210-a and a first beam 215-a, and the second pair of PUSCH repetitions (e.g., PUSCH repetitions #2 and #4) may be associated with a second SRS resource set 220 and may be transmitted by the UE 115-a using a second antenna panel 210-b and a second beam 215-b.

In this regard, some wireless communications systems support single-DCI based SFN PUSCH transmissions, in which a single DCI message schedules a PUSCH (e.g., repetitions of a PUSCH), where each demodulation reference signal (DMRS) port (e.g., each layer) of the PUSCH is transmitted from two antenna panels 210-a, 210-b with different Tx beams 215-a, 215-b, different precoders different power control parameters, etc. Moreover, in such cases, all layers of the PUSCH transmission (Layer 0, Layer 1) are associated with two SRS resource sets 220. For example, the UE 115-a may transmit a first PUSCH repetition via the first antenna panel 210-a and a second PUSCH repetition via a second antenna panel 210-b. In this example, both PUSCH repetitions may be associated with Layers 0 and 1, where the first PUSCH repetition is associated with a first SRS resource set 220 and first Tx beam 215-a/first TCI state, and where the second PUSCH repetition is associated with a second SRS resource set 220 and second Tx beam 215-b/second TCI state.

However, conventional wireless communications systems do not enable SRSs 230 to be transmitted in an SFNed manner (e.g., separate SRS resource sets 220 for separate Tx parameters). That is, wireless communications systems enable a single SRS resource set 220 to be associated with a single set of Tx parameters for a given PUSCH transmission. Accordingly, in order to perform single DCI-based SFN PUSCH transmissions, the scheduling DCI message may include an SRS resource set 220 indicator field, two SRI fields (e.g., two SRI 245 fields), and two TPMI fields to indicate the respective parameters for the different PUSCH repetitions. In other words, non-SFNed SRSs 230 may require the scheduling DCI message to indicate multiple sets of SRS resource sets 220, thereby increasing signaling overhead. Moreover, the use of multiple SRS resource sets 220 to transmit repetitions of the same data payload may result in an inefficient use of resources.

While current wireless communications systems do not support SFNed SRS 230 transmissions, there may be benefits to SFNed PUSCH transmissions if SRS 230 transmissions are also SFNed. In other words, there may be benefits to SFNed PUSCH transmissions if SRS 230 transmissions are also transmitted in an SFN manner in which each SRS port of each SRS resource 225 is transmitted from two antenna panels 210 with two different Tx beams 215, two different precoders, and two different sets of power control parameters.

For example, enabling SRSs 230 to be transmitted in an SFN manner may enable smaller overhead for SRS 230 transmissions at the network side to determine the precoding for PUSCH transmissions. In particular, two different SRS resource sets 220 do not have to be indicated, as SFNed PUSCHs may be associated with a single SRS resource set 220, where each port of each SRS resource 225 in the SRS resource set 220 is transmitted in an SFNed manner (e.g., different PUSCHs transmitted via different antenna panels 210 with different Tx parameters/beams 215).

Techniques described herein may enable SFNed SRS 230 transmissions, thereby enabling smaller DCI overhead (for DCI scheduling PUSCHs), as the scheduling DCI may indicate a single SRI 245 field and a single TPMI field (as opposed to DCI messages used to schedule SFN PUSCHs without SFN SRS 230 which require two SRI 245 fields and two TPMI fields). In some cases, SFN SRS 230 may reduce the flexibility of SFN PUSCH, as it may not be possible to indicate separate TPMIs/precoders that are to be applied to different antenna panels 210 for the SFN PUSCH. Accordingly, in some aspects, SFNed SRS 230 transmissions may be used in addition to non-SFNed SRS 230 transmissions. In such cases, restrictions may be implemented in the case of SFN PUSCH based on non-SFN. For example, two SRI 245 fields within scheduling DCI may be used to indicate the same number of SRS resources 225 for non-codebook-based PUSCH in case of separate SRS resource sets 220 (non-SFN SRS). Similarly, two TPMI fields within scheduling DCI may be used to indicate the same number of layers for codebook-based PUSCH in case of separate SRS resource sets 220 (non-SFN SRS).

Accordingly, aspects of the present disclosure are directed to techniques for transmitting SRSs 230 in an SFN configuration, in which an SRS resource set 220 can be associated with multiple sets of Tx parameters. In other words, the wireless communications system 200 may support SFNed SRS 230 transmissions to realize the attendant advantages described herein.

For example, referring to FIG. 2, the UE 115-a may receive, from the network entity 105-a, first control signaling 240-a (e.g., RRC signaling, MAC-CE signaling, DCI signaling) that indicates an SFN configuration associated with at least one SRS resource 225 of an SRS resource set 220. In this regard, the first control signaling 240-a may indicate a configuration for performing SFNed SRS 230 transmissions. In other words, the SFN configuration may enable the UE 115-a to transmit SRSs 230 in an SFN manner, where each SRS port of an SRS resource 225 is transmitted with two sets of Tx parameters (e.g., two Tx beams 215, two TCI states, two precoders, two sets of power control params, from two antenna panels 210, etc.).

The first control signaling 240-a indicating the SFN configuration (e.g., SFN transmission mode) may include, but is not limited to, RRC signaling, MAC-CE signaling (e.g., along with an activation of the semi-persistent SRS resource set 220), DCI signaling (e.g., along with a trigger for the aperiodic SRS resource set 220), or any combination thereof.

In some aspects, the SFN configuration may apply to (e.g., be associated with) each SRS resource of the SRS resource set 220 (e.g., per-SRS resource set 220), or to individual SRS resources 225 of the SRS resource set 220 (e.g., per-SRS resource 225). If the SFN configuration is applied per-SRS resource set 220, the SFN configuration may apply to all SRS resources 225 (e.g., SRS resources 225-a, 225-b, 225-c, and 225-d) within the SRS resource set 220. Comparatively, if the SFN configuration is applied per-SRS resource 225, the SFN configuration may apply to only a subset of the SRS resources 225-a, 225-b, 225-c, and 225-d (e.g., apply to the first SRS resource 225-a, but not to the second SRS resource 225-b). For the purposes of the present disclosure, the SFN configuration may apply to at least the first SRS resource 225-a of the SRS resource set 220.

In some aspects, the SFN configuration may indicate multiple sets of Tx parameters for SFN transmissions associated with the SRS resource set 220 (e.g., Tx parameters for SFNed SRS transmissions). For example, the SFN configuration may indicate a first set of Tx parameters and a second set of Tx parameters. The respective sets of Tx parameters indicated via the SFN configuration may include, but are not limited to, a CSI-RS, a Tx beam 215, a TCI state, a precoder, a power control parameter, an antenna panel 210 at the UE 115-a, an intended TRP 235 at the network entity 105-a, or any combination thereof.

For example, in some implementations, the first control signaling 240-a may indicate one or more CSI-RS resources associated with the SRS resource set 220, where the one or more CSI-RS resources may be used by the UE 115-a to determine precoders that will be used to perform SFNed SRS transmissions.

In some aspects, the SFN configuration (e.g., SFN transmission mode) may be applicable only to certain SRS usage (e.g., applicable to SRS resource sets 220 configured with usage "codebook," "non-codebook," or both). In cases where the SRS resource set 220 is configured with usage "non-codebook," two associated CSI-RS resources can be configured for the SRS resource set 220 if it is configured with SFN transmission mode. In other words, the first control signaling 240-a and/or SFN configuration may indicate two CSI-RSs associated with the SRS resource set, where the UE 115-a determines SRS precoding (e.g., precoders for SRS resources 225 within the SRS resource set 220) based on the two associated CSI-RS resources.

In some aspects, the UE 115-a may receive, from the network entity 105-a, second control signaling 240-b (e.g., DCI, MAC-CE) that schedules the UE 115-a to transmit one or more SRSs 230 associated with the first SRS resource 225-a of the SRS resource set 220. In this regard, the second control signaling 240-b may schedule the UE 115-a to transmit a SFNed SRS 230 associated with the first SRS resource 225-a. The UE 115-a may receive the second control signaling 240-b based on receiving the first control signaling 240-a. In additional or alternative implementations, the second control signaling 240-b may trigger or activate the SFN configuration, the associated SRS resource set 220, or both.

In some aspects, the second control signaling 240-b may indicate one or more parameters or characteristics associated with the scheduled SFNed SRS 230. For example, in some implementations, the second control signaling 240-b may indicate which sets of Tx parameters of the SFN configuration are to be used for the SFNed SRS 230. For instance, the second control signaling 240-b may indicate a first set of Tx parameters and a second set of Tx parameters indicated via the SFN configuration that are to be used to transmit the SRS 230 associated with the first SRS resource 225-a.

In additional or alternative implementations, the second control signaling 240-b may indicate individual parameters associated with (e.g., included within) the respective sets of Tx parameters, including precoders, beams 215, TCI states, and the like. For example, the second control signaling 240-b may indicate a TCI state and a second TCI state, where the first and second sets Tx parameters for the scheduled SFNed SRS 230 include the first and second TCI states, respectively.

In the context of unified TCI, MAC-CE and/or DCI may be used to indicate two TCI states that are to be applied to multiple downlink/uplink channels starting at a certain time (e.g., for a beam application time, which may be defined a certain time after HARQ-ACK corresponding to the beam indication in MAC-CE/DCI is received). Accordingly, in the case of unified TCI, the first control signaling 240-a, the second control signaling 240-b, or both, may indicate two uplink TCI states or joint TCI states that are associated with (e.g., indicate) the two Tx beams 215-a, 215-b (for each SRS port of the SRS resource(s) 225) that will be used to transmit the SFNed SRS 230. In such cases, the two sets of power control parameters associated with the two indicated TCI states may also be applied to each SRS port of the SRS resource 225 associated with the SFN configuration. In other words, the joint TCI behavior may only be applied to SRS resource(s) 225 or SRS resource sets 220 that are configured with (e.g., associated with) the SFN configuration/transmission mode. For example, the two indicated TCI states may not be applied to other SRS resources 225 or SRS resource sets 220 that are not associated with the SFN configuration (in which case none of the indicated TCI states are applied, or only one of the TCI states are applied).

In some aspects, the UE 115-a may transmit, to the network entity 105-a, an SRS 230 associated with the first SRS resource 225-a in accordance with a first set of Tx parameters indicated by the SFN configuration. For example, the UE 115-a may transmit a the SRS 230 via the first antenna panel 210-a and using a first set of Tx parameters (e.g., first Tx beam 215-a, first precoder, first TCI state, first power control parameter(s)). In some aspects, the UE 115-a may transmit the SRS 230 using the first set of Tx parameters to the first TRP 235-a at the network entity 105-a.

Similarly, the UE 115-a may transmit, to the network entity 105-a, the SRS 230 associated with the first SRS resource 225-a in accordance with a second set of Tx parameters indicated by the SFN configuration. For example, the UE 115-a may transmit the SRS 230 via the second antenna panel 210 using a second set of Tx parameters (e.g., second Tx beam 215-b, second precoder, second TCI state, second power control parameter(s)). In some aspects, the UE 115-a may transmit the SRS using the second set of Tx parameters to the second TRP 235-b at the network entity 105-a.

The UE 115-a may transmit the SRS 230 associated with the first SRS resource 225-a using the first and second sets of Tx parameters based on receiving the first control signaling 240-a, receiving the second control signaling 240-b, determining the first set of Tx parameters, or any combination thereof. For example, in cases where the first control signaling 240-a and/or the second control signaling 240-b indicates one or more CSI-RS resources associated with the SRS resource set 220, the UE 115-a may transmit the SRS 230 in accordance with a first and second precoder that are determined based on the one or more CSI-RS resources. By way of another example, the UE 115-a may transmit the SRS 230 based on one or more TCI states (e.g., unified or joint TCI) indicated via the first control signaling 240-a and/or the second control signaling 240-b.

In some implementations, the UE 115-a may transmit additional SRSs 230 that are associated with other SRS resources 225 of the SRS resource set 220, such as the second SRS resource 225-b. Whether the additional SRSs 230 associated with the additional SRS resources 225 are transmitted in an SFN manner may be based on whether the additional SRS resources 225 are also associated with the SFN configuration. For example, if the second SRS resource 225-b is not associated with the SFN configuration, additional SRSs 230 associated with the second SRS resource 225-b may be transmitted in a non-SFNed manner (e.g., single set of Tx parameters). Comparatively, if the third SRS resource 225-c is associated with the SFN configuration, additional SRSs 230 associated with the third SRS resource 225-c may be transmitted in an SFNed manner (e.g., two sets of Tx parameters). This concept will be further shown and described with reference to FIG. 3.

In some aspects, the UE 115-a may receive, from the network entity 105-a, third control signaling 240-c (e.g., DCI, MAC-CE) scheduling the UE 115-a to perform an uplink message 250. In particular, the third control signaling 240-c may schedule an SFN PUSCH based on the SFNed SRS(s) 230. In some aspects, the uplink message 250 may be associated with an SRS resource 225 of the SRS resource set 220. For example, the scheduled uplink message 250 may be associated with the first SRS resource 225-a (e.g., the third control signaling 240-c may indicate the first SRS resource 225-a) that corresponds to SRSs 230.

In other words, the third control signaling 240-c may schedule the UE 115-a to transmit a PUSCH in an SFN manner, where each DMRS port and/or each PUSCH layer of the scheduled uplink message 250 is transmitted with two sets of Tx parameters (e.g., two Tx beams 215, two TCI states, two precoders, two sets of power control params, from two antenna panels 210, etc.). In particular, the SFNed uplink message 250 may be scheduled based on one or more indicated SRS resources 225 (e.g., first SRS resource 225-a) associated with the uplink message 250 being associated/configured with the SFN configuration and being used to transmit the SRSs 230, 230 in an SFN manner.

For example, the network entity 105-a may perform measurements on the SRSs 230 to perform channel estimation and to determine what set(s) of Tx parameters exhibit sufficient (e.g., highest) performance. In such cases, the network entity 105-a may schedule the UE 115-a to perform the uplink message 250 using the set(s) of Tx parameters that exhibit sufficient (e.g., highest) performance. As such, the third control signaling 240-c may indicate the SFNed SRS resource 225 (and/or corresponding sets of Tx parameters) that is associated with the scheduled SFNed PUSCH.

For instance, the third control signaling 240-c may include or indicate an SRI 245 associated with the first SRS resource 225-a. In some implementations, the third control signaling 240-c may indicate additional or alternative parameters associated with the scheduled SFN uplink message 250 including, but not limited to, a TPMI. In other words, the third control signaling 240-c may indicate the one or more corresponding SRS resources 225 associated with the scheduled uplink message 250 via SRI 245 signaling. For example, the SRI field in a DCI message may indicate the SRI 245 corresponding to the SRS resource 225 when the PUSCH is scheduled/activated by a DCI message (e.g., DG-PUSCH, CG-PUSCH in Type 2 CG, or RRC configured parameter "srs-ResourceIndicator" when PUSCH is Type 1 CG).

Subsequently, the UE 115-a may transmit, to the network entity 105-a, the uplink message 250 (e.g., SFNed uplink message 250-a) associated with the first SRS resource 225-a. In particular, the UE 115-a may transmit the SFNed uplink message 250-a based on receiving the third control signaling 240-c scheduling the uplink message 250, and in accordance with the SFN configuration. Moreover, the UE 115-a may transmit the SFNeduplink message 250-a via the first antenna panel 210-a of the UE 115-a and using the first set of Tx parameters (e.g., first Tx beam 215-a, first precoder, first TCI state, first power control parameter(s)). In some aspects, the UE 115-a may transmit the first SFNed uplink message 250-a using the first set of Tx parameters to the first TRP 235-a at the network entity 105-a.

Similarly, the UE 115-a may transmit, to the network entity 105-a, the uplink message 250 (e.g., SFNed uplink message 250-b) associated with the first SRS resource 225-a. In particular, the UE 115-a may transmit the SFNed uplink message 250-b based on receiving the third control signaling 240-c scheduling the uplink message 250, and in accordance with the SFN configuration. Moreover, the UE 115-a may transmit the SFNed uplink message 250-b via the second antenna panel 210-b of the UE 115-a and using the second set of Tx parameters (e.g., second Tx beam 215-b, second precoder, second TCI state, second power control parameter(s)). In some aspects, the UE 115-a may transmit the SFNed uplink message 250-b using the second set of Tx parameters to the second TRP 235-b at the network entity 105-a.

In this regard, each PUSCH port of the uplink message 250 may be transmitted with two sets of Tx parameters. As compared to non-SFNed SRSs, the SFNed SRSs 230 illustrated in FIG. 2 may enable the message scheduling the uplink message 250 to indicate one SRS resource set 220 and one TPMI/SRI 245. Moreover, as described herein, the SFN configuration may apply to all or just a subset of the SRS resources 225 of the SRS resource set 220. As such, whether the uplink message 250 (e.g., PUSCH) is SFNed or not may depend on whether the indicated SRS resource 225 associated with the scheduled uplink message 250 is associated with the SFN configuration.

Techniques described herein may enable the UE 115-*a* to transmit SRSs 230 in an SFNed manner. In other words, techniques described herein may enable the UE 115-*a* to transmit an SRS 230 associated with the same SRS resource 225 using multiple sets of Tx parameters. As such, techniques described herein may enable control messages (e.g., DCI messages) which schedule SFNed SRSs 230 and/or uplink messages 250 to indicate fewer SRS resource sets 220 while still enabling scheduled SRSs 230/uplink messages 250 to be performed in accordance with multiple sets of Tx parameters, thereby decreasing signaling overhead used to schedule SRSs 230/uplink messages 250. Moreover, the use of a single SRS resource set 220 (or SRS resource 225) to transmit SFNed SRSs 230 and/or uplink messages 250 may result in more efficient use of resources within the wireless communications system 200.

Figure 3:
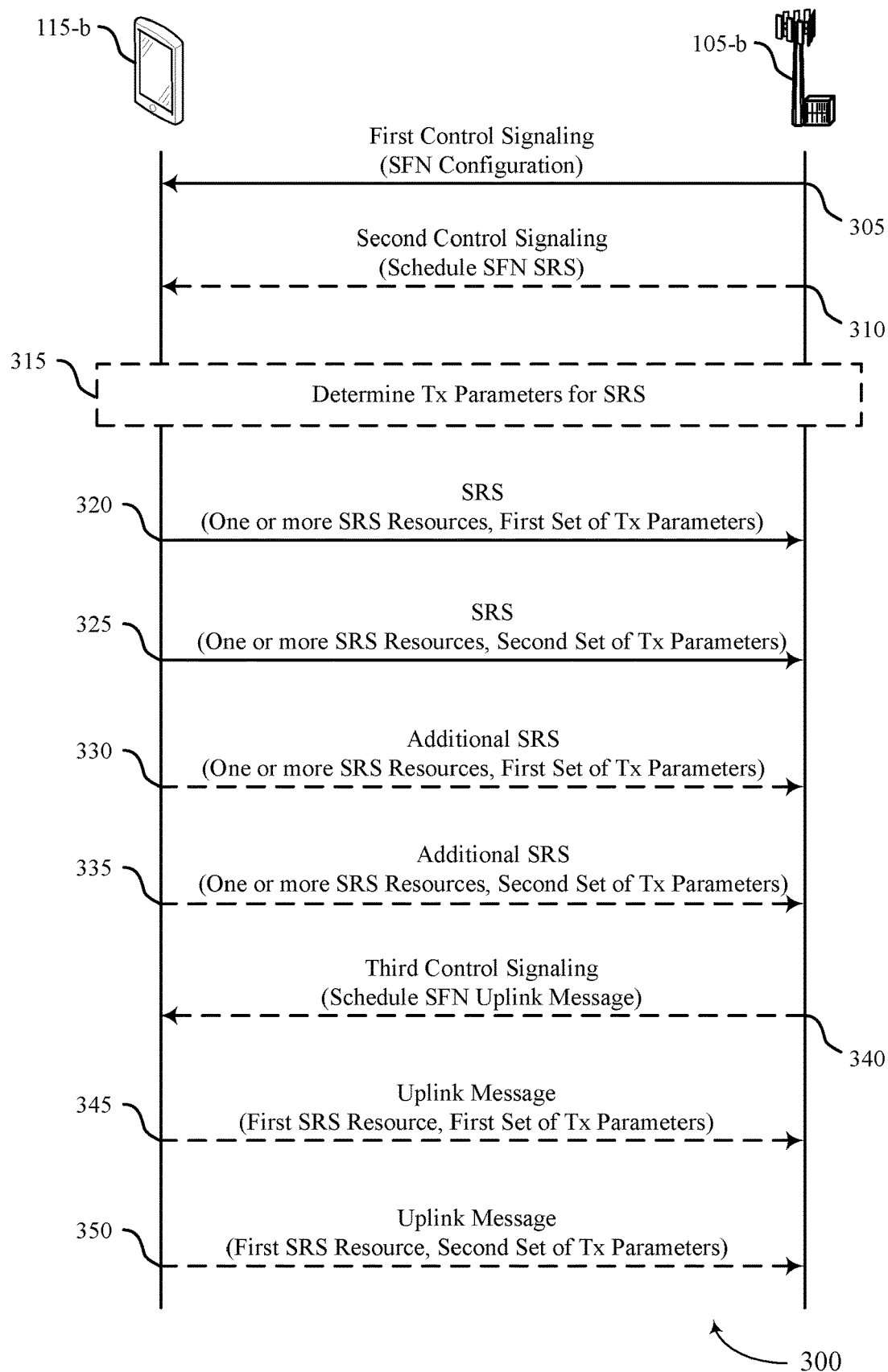
FIG. 3 illustrates an example of a process flow that supports techniques for SFN SRS transmission in accordance with one or more aspects of the present disclosure.

FIG. 3 illustrates an example of a process flow 300 that supports techniques for SFN SRS transmission in accordance with one or more aspects of the present disclosure. In some examples, aspects of the process flow 300 may implement, or be implemented by, aspects of the wireless communications system 100, the wireless communications system 200, or both. In particular, the process flow 300 illustrates signaling for SFNed SRS transmissions, as described with respect to FIG. 1-2.

The process flow 300 may include a UE 115-*b* and a network entity 105-*b*, which may be examples of UEs 115, network entities 105, and other wireless devices described with reference to FIGS. 1-2. For example, the UE 115-*b* and the network entity 105-*b* illustrated in FIG. 3 may be examples of the UE 115-*a* and the network entity 105-*a*, respectively, as shown and described in FIG. 2.

In some examples, the operations illustrated in process flow 300 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-*b* may receive, from the network entity 105-*b*, first control signaling (e.g., RRC signaling) that indicates an SFN configuration associated with an SRS resource set. In other words, the first control signaling may indicate a configuration for performing SFNed SRS transmissions. In some aspects, the SFN configuration may apply to (e.g., be associated with) each SRS resource of the SRS resource set (e.g., per-SRS resource set), or to individual SRS resources of the SRS resource set (e.g., per-SRS resource). For example, the SFN configuration may apply to at least a first SRS resource of the SRS resource set.

In some aspects, the SFN configuration may indicate multiple sets of Tx parameters for SFN transmissions associated with the SRS resource set (e.g., Tx parameters for SFNed SRS transmissions). For example, the SFN configuration may indicate a first set of Tx parameters and a second set of Tx parameters. The respective sets of Tx parameters indicated via the SFN configuration may include, but are not limited to, a CSI-RS, a transmit beam, a TCI state, a precoder, a power control parameter, an antenna panel at the UE 115-*b*, an intended TRP at the network entity 105-*b*, or any combination thereof.

For example, in some implementations, the first control signaling may indicate one or more CSI-RS resources associated with the SRS resource set, where the one or more CSI-RS resources may be used by the UE 115-*b* to determine precoders that will be used to perform SFNed SRS transmissions.

At 310, the UE 115-*b* may receive, from the network entity 105-*b*, second control signaling (e.g., DCI, MAC-CE) that schedules the UE 115-*b* to transmit SRSs associated with one or more SRS resources (e.g., at least the first SRS resource) of the SRS resource set. In this regard, the second control signaling may schedule the UE 115-*b* to transmit a SFNed SRS associated with the one or more SRS resources. The UE 115-*b* may receive the second control signaling at 310 based on receiving the first control signaling at 305.

In some aspects, the second control signaling may indicate one or more parameters or characteristics associated with the scheduled SFNed SRS. For example, in some implementations, the second control signaling may indicate which sets of Tx parameters of the SFN configuration are to be used for the SFNed SRS. For instance, the second control signaling may indicate a first set of Tx parameters and a second set of Tx parameters indicated via the SFN configuration that are to be used to transmit the SRS associated with the one or more SRS resources (e.g., the first SRS resource).

In additional or alternative implementations, the second control signaling may indicate individual parameters associated with (e.g., included within) the respective sets of Tx parameters, including precoders, beams, TCI states, and the like. For example, the second control signaling may indicate a first TCI state and a second TCI state, where the first and second sets Tx parameters for the scheduled SFNed SRS include the first and second TCI states, respectively.

At 315, the UE 115-*b*, the network entity 105-*b*, or both, may determine sets of Tx parameters that will be used for transmitting the scheduled SRS. For example, in the context of an SFNed SRS, the UE 115-*b* and/or the network entity 105-*b* may determine a first set of Tx parameters and a second set of Tx parameters associated with the SFNed SRS. The respective sets of Tx parameters indicated via the SFN configuration may include, but are not limited to, a transmit beam, a TCI state, a precoder, a power control parameter, an antenna panel at the UE 115-*b*, an intended TRP at the network entity 105-*b*, an associated CSI-RS, or any combination thereof. In this regard, the UE 115-*b* and the network entity 105-*b* may determine the Tx parameters at 315 based on the first control signaling at 305, the second control signaling at 310, or both.

At 320, the UE 115-*b* may transmit, to the network entity 105-*b*, an SFNed SRS associated with the one or more SRS resources (e.g., first SRS resource) in accordance with a first set of Tx parameters indicated by the SFN configuration. For example, the UE 115-*b* may transmit the SRS via a first antenna panel of the UE 115-*b* and using a first set of Tx parameters (e.g., first Tx beam, first precoder, first TCI state, first power control parameter(s)). In some aspects, the UE 115-*b* may transmit the SRS using the first set of Tx parameters to a first TRP at the network entity 105-*b*.

The UE 115-*b* may transmit the SFNed SRS based on receiving the first control signaling at 305, receiving the second control signaling at 310, determining the first set of Tx parameters at 315, or any combination thereof. For example, in cases where the first control signaling and/or the second control signaling indicates one or more CSI-RS resources associated with the SRS resource set, the UE 115-*b* may transmit the SRS using the first set of Tx parameters in accordance with a first precoder that is determined based on the one or more CSI-RS resources. By way of another example, the UE 115-*b* may transmit the SRS based on a first TCI state indicated via the first control signaling and/or the second control signaling.

At 325, the UE 115-*b* may transmit, to the network entity 105-*b*, the SFNed SRS associated with the one or more SRS resources (e.g., first SRS resource) in accordance with a second set of Tx parameters indicated by the SFN configuration. For example, the UE 115-*b* may transmit the SFNed SRS via a second antenna panel of the UE 115-*b* and using a second set of Tx parameters (e.g., second Tx beam, second precoder, second TCI state, second power control parameter(s)). In some aspects, the UE 115-*b* may transmit the SRS using the second set of Tx parameters to a second TRP at the network entity 105-*b*.

The UE 115-*b* may transmit the s SFNed SRS based on receiving the first control signaling at 305, receiving the second control signaling at 310, determining the second set of Tx parameters at 315, or any combination thereof. For example, in cases where the first control signaling and/or the second control signaling indicates one or more CSI-RS resources associated with the SRS resource set, the UE 115-*b* may transmit the SRS in accordance with a second precoder that is determined based on the one or more CSI-RS resources. By way of another example, the UE 115-*b* may transmit the SRS based on a second TCI state indicated via the first control signaling and/or the second control signaling.

In some implementations, the UE 115-*b* may transmit additional SRSs that are associated with other SRS resources of the SRS resource set, such as a second set of one or more SRS resources. In other words, in cases where the SFNed SRSs at 320 and 325 are associated with the first set of one or more SRS resources, the UE 115-*b* may transmit additional SRSs associated with a second set of one or more SRS resources. This is shown at steps 330 and 335 of the process flow 300.

At 330, the UE 115-*b* may transmit, to the network entity 105-*b*, an additional SRS associated with a second set of one or more SRS resources of the SRS resource set. As such, the additional SRS illustrated at 330 may be associated with a different set of one or more SRS resources of the SRS resource set as compared to the SRSs illustrated at 320 and 325. The UE 115-*b* may transmit the additional SRS based on receiving the first control signaling at 305, receiving the second control signaling at 310, determining the sets of Tx parameters at 315, transmitting the SFNed SRS at 320 and 325, or any combination thereof.

As noted previously herein, the SFN configuration may correspond to each SRS resource of the SRS resource set (e.g., per-SRS resource set), or to individual SRS resources of the SRS resource set (e.g., per-SRS resource). In this regard, the SFN configuration may or may not apply to the second SRS resource associated with the additional SRS at 330.

For example, in cases where the SFN configuration is associated with (e.g., applies to) the second set of one or more SRS resources, the UE 115-*b* may transmit the additional SRS at 330 in accordance with one of the first or second sets of Tx parameters, where the additional SRS may be transmitted in accordance with the other of the first or second Tx parameters (as shown at 335). In other words, in cases where the SFN configuration is associated with (e.g., applies to) the second set of one or more SRS resources, the UE 115-*b* may transmit additional SFNed SRSs associated with the second set of one or more SRS resources using multiple sets of Tx parameters (e.g., SFNed SRS). Comparatively, in cases where the SFN configuration is not associated with (e.g., does not apply to) the second set of one or more SRS resources, the UE 115-*a* may be configured to transmit the additional SRS in accordance with a single set of Tx parameters (e.g., non-SFNed SRS).

At 335, the UE 115-*b* may transmit, to the network entity 105-*b*, the additional SFNed SRS associated with the second set of one or more SRS resources of the SRS resource set. As such, the additional SRS illustrated at 335 may be associated with the same set of one or more SRS resources as the additional SRS at 330, but a different set of one or more SRS resources as compared to the SRSs illustrated at 320 and 325. The UE 115-*b* may transmit the additional SRS based on receiving the first control signaling at 305, receiving the second control signaling at 310, determining the sets of Tx parameters at 315, transmitting the SFNed SRS at 320 and 325, or any combination thereof.

For example, in cases where the SFN configuration is associated with the second set of one or more SRS resources, the UE 115-*b* may transmit the additional SRS at 330 in accordance with the first set of Tx parameters, and may transmit the additional SRS at 335 in accordance with the second set of Tx parameters. In this example, the UE 115-*b* may transmit the additional SRS at 330 via a first antenna panel and to a first TRP of the network entity 105-*b*, and may transmit the additional SRS at 335 via a second antenna panel and to a second TRP of the network entity 105-*b*.

As such, in some implementations the additional SFNed SRS at 330 and 335 may be transmitted in accordance with the same sets of Tx parameters that were used to transmit the SFNed SRS at 320 and 325. However, in additional or alternative implementations, additional SFNed SRS at 330 and 335 may be transmitted via different sets of Tx parameters as compared to the SFNed SRS at 320 and 325. For example, in some cases, the UE 115-*b* may receive an additional DCI message scheduling the additional SFNed SRS associated with the second set of one or more SRS resources, where the additional DCI message indicates different sets of Tx parameters that are to be used for the additional SFNed SRS.

At 340, the UE 115-*b* may receive, from the network entity 105-*b*, third control signaling (e.g., DCI, MAC-CE) scheduling the UE 115-*b* to perform an uplink message. In particular, the third control signaling may schedule an SFN PUSCH based on the SFNed SRS(s). In some aspects, the uplink message may be associated with one or more SRS resources of the SRS resource set. For example, the scheduled uplink message may be associated with the first set of one or more SRS resources (e.g., the third control signaling may indicate the first set of one or more SRS resources). The UE 115-*b* may receive the third control signaling at 340 based on receiving the first control signaling at 305, receiving the second control signaling at 310, determining the sets of Tx parameters at 315, transmitting the SFNed SRS at 320 and 325, transmitting the additional SRS at 320 and 335, or any combination thereof.

For example, the network entity 105-*b* may perform measurements on the SFNed SRSs received at 320, 325, 330, and/or 335 to perform channel estimation and to determine what set(s) of Tx parameters exhibit the highest performance. In such cases, the network entity 105-*b* may schedule the UE 115-*b* to perform the uplink message using the set(s) of Tx parameters that exhibit sufficient (e.g., highest) performance. As such, the third control signaling may indicate the SFNed SRS resource(s) (and/or corresponding sets of Tx parameters) that is associated with the scheduled SFNed PUSCH. For instance, the third control signaling may include or indicate an SRI associated with the one or more SRS resource. In some implementations, the third control signaling may indicate additional or alternative parameters associated with the scheduled SFN uplink message including, but not limited to, a TPMI.

At 345, the UE 115-*b* may transmit, to the network entity 105-*b*, the uplink message (e.g., SFNed uplink message) associated with the one or more SRS resources. In particular, the UE 115-*b* may transmit the SFNed uplink message based on receiving the third control signaling scheduling the uplink message at 340, and in accordance with the SFN configuration. Moreover, the UE 115-*b* may transmit the SFNed uplink message via the first antenna panel of the UE 115-*b* and using the first set of Tx parameters (e.g., first Tx beam, first precoder, first TCI state, first power control parameter(s)). In some aspects, the UE 115-*b* may transmit the SFNed uplink message using the first set of Tx parameters to the first TRP at the network entity 105-*b*.

At 350, the UE 115-*b* may transmit, to the network entity 105-*b*, the uplink message (e.g., SFNed uplink message) associated with the first SRS resource. In particular, the UE 115-*b* may transmit the SFNed uplink message based on receiving the third control signaling scheduling the uplink message at 340, and in accordance with the SFN configuration. Moreover, the UE 115-*b* may transmit the SFNed uplink message via the second antenna panel of the UE 115-*b* and using the second set of Tx parameters (e.g., second Tx beam, second precoder, second TCI state, second power control parameter(s)). In some aspects, the UE 115-*b* may transmit the SFNed uplink message using the second set of Tx parameters to the second TRP at the network entity 105-*b*.

Techniques described herein may enable the UE 115-*b* to transmit SRSs in an SFNed manner. In other words, techniques described herein may enable the UE 115-*b* to transmit SFNed SRSs associated with the same SRS resource using multiple sets of Tx parameters. As such, techniques described herein may enable control messages (e.g., DCI messages) which schedule SFNed SRSs and/or uplink messages to indicate fewer sets of SRS resources while still enabling scheduled SRSs/uplink messages to be performed in accordance with multiple sets of Tx parameters, thereby decreasing signaling overhead used to schedule SRSs/uplink messages. Moreover, the use of a single SRS set (or SRS resource) to transmit SRSs and/or uplink messages in an SFN manner may result in more efficient use of resources within the wireless communications system.

Figure 4:
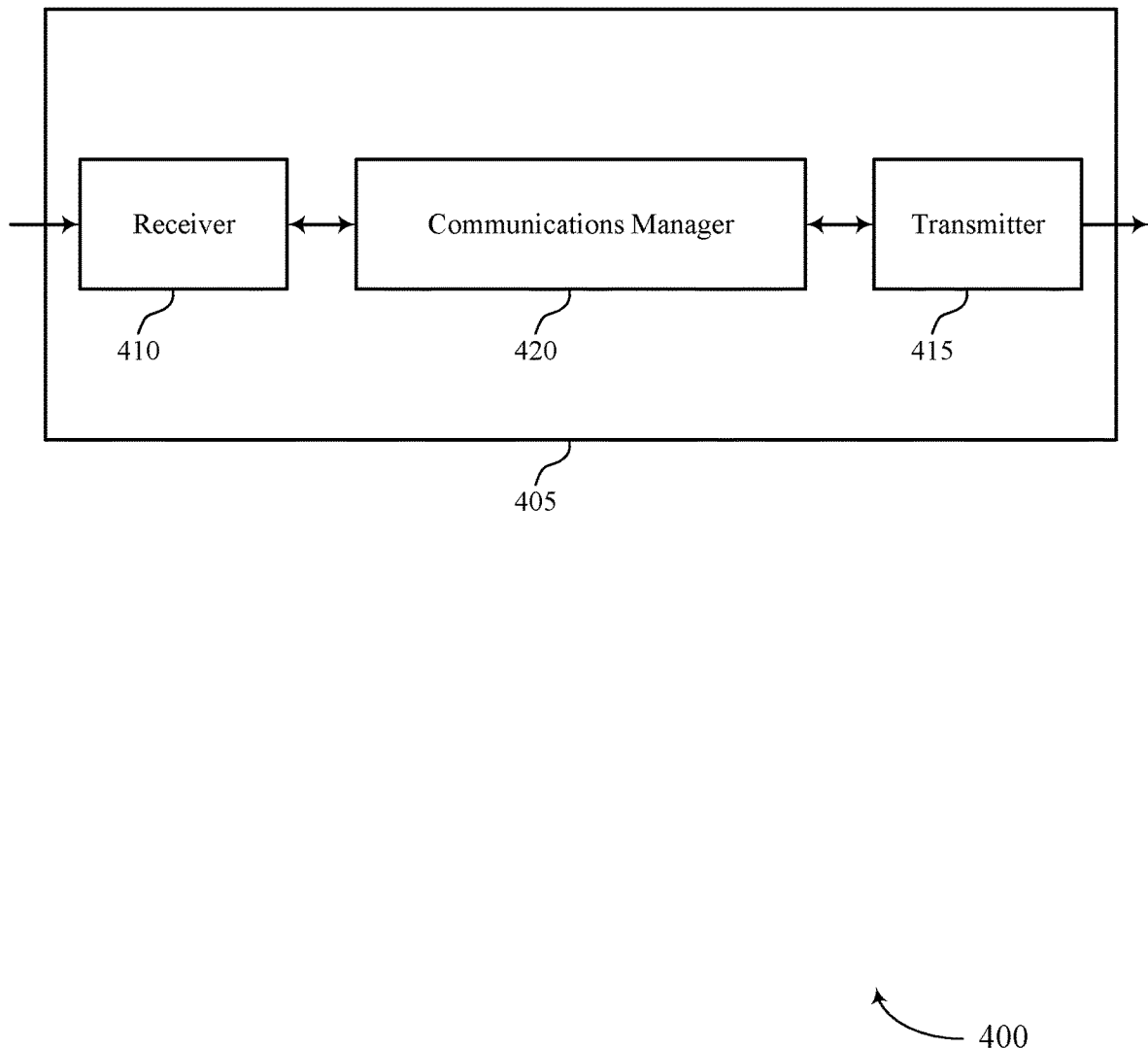
FIGS. 4 and 5 show block diagrams of devices that support techniques for SFN SRS transmission in accordance with one or more aspects of the present disclosure.

FIG. 4 shows a block diagram 400 of a device 405 that supports techniques for SFN SRS transmission in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for SFN SRS transmission). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for SFN SRS transmission). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for SFN SRS transmission as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

For example, the communications manager 420 may be configured as or otherwise support a means for receiving, from a network entity, first control signaling indicating a SFN configuration associated with a first SRS resource of an SRS resource set, the SFN configuration indicating a set of multiple sets of transmission parameters for SFN transmissions associated with the first SRS resource. The communications manager 420 may be configured as or otherwise support a means for transmitting an SRS associated with the first SRS resource in accordance with a first set of transmission parameters indicated by the SFN configuration. The communications manager 420 may be configured as or otherwise support a means for transmitting the SRS associated with the first SRS resource in accordance with a second set of transmission parameters indicated by the SFN configuration.

By including or configuring the communications manager 420 in accordance with examples as described herein, the device 405 (e.g., a processor controlling or otherwise coupled with the receiver 410, the transmitter 415, the communications manager 420, or a combination thereof) may support techniques that enable UEs 115 to transmit SRSs in an SFNed manner. In other words, techniques described herein may enable wireless devices to transmit an SRS associated with the same SRS resource using multiple sets of Tx parameters. As such, techniques described herein may enable control messages (e.g., DCI messages) which schedule SFNed SRSs and/or uplink messages to indicate fewer sets of SRS resources while still enabling scheduled SRSs/uplink messages to be performed in accordance with multiple sets of Tx parameters, thereby decreasing signaling overhead used to schedule SRSs/uplink messages. Moreover, the use of a single SRS set (or SRS resource) to transmit SFNed SRSs and/or uplink messages may result in more efficient use of resources within the wireless communications system 100.

Figure 5:
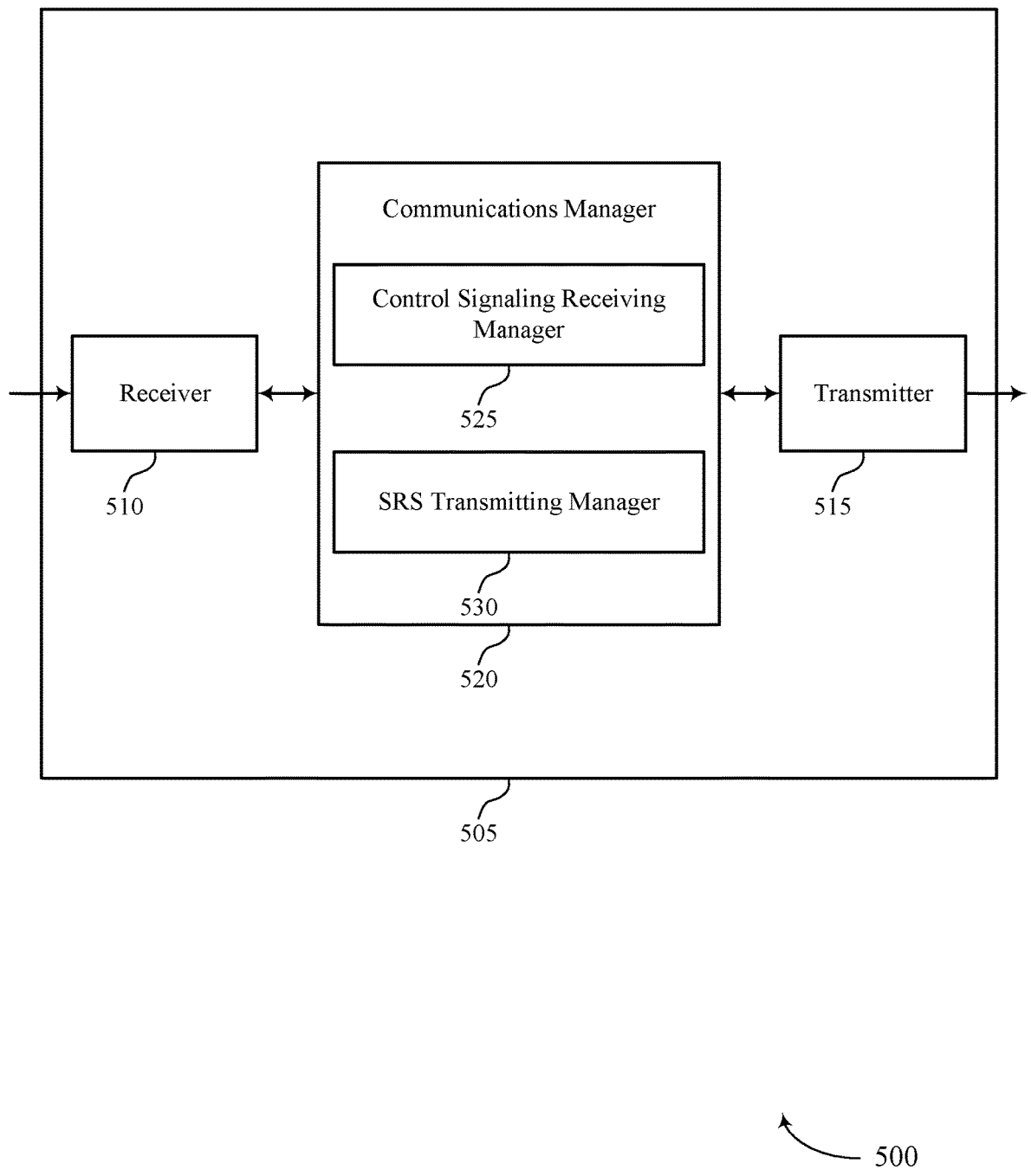

FIG. 5 shows a block diagram 500 of a device 505 that supports techniques for SFN SRS transmission in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for SFN SRS transmission). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for SFN SRS transmission). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for SFN SRS transmission as described herein. For example, the communications manager 520 may include a control signaling receiving manager 525 an SRS transmitting manager 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The control signaling receiving manager 525 may be configured as or otherwise support a means for receiving, from a network entity, first control signaling indicating a SFN configuration associated with a first SRS resource of an SRS resource set, the SFN configuration indicating a set of multiple sets of transmission parameters for SFN transmissions associated with the first SRS resource. The SRS transmitting manager 530 may be configured as or otherwise support a means for transmitting an SRS associated with the first SRS resource in accordance with a first set of transmission parameters indicated by the SFN configuration. The SRS transmitting manager 530 may be configured as or otherwise support a means for transmitting the SRS associated with the first SRS resource in accordance with a second set of transmission parameters indicated by the SFN configuration.

Figure 6:
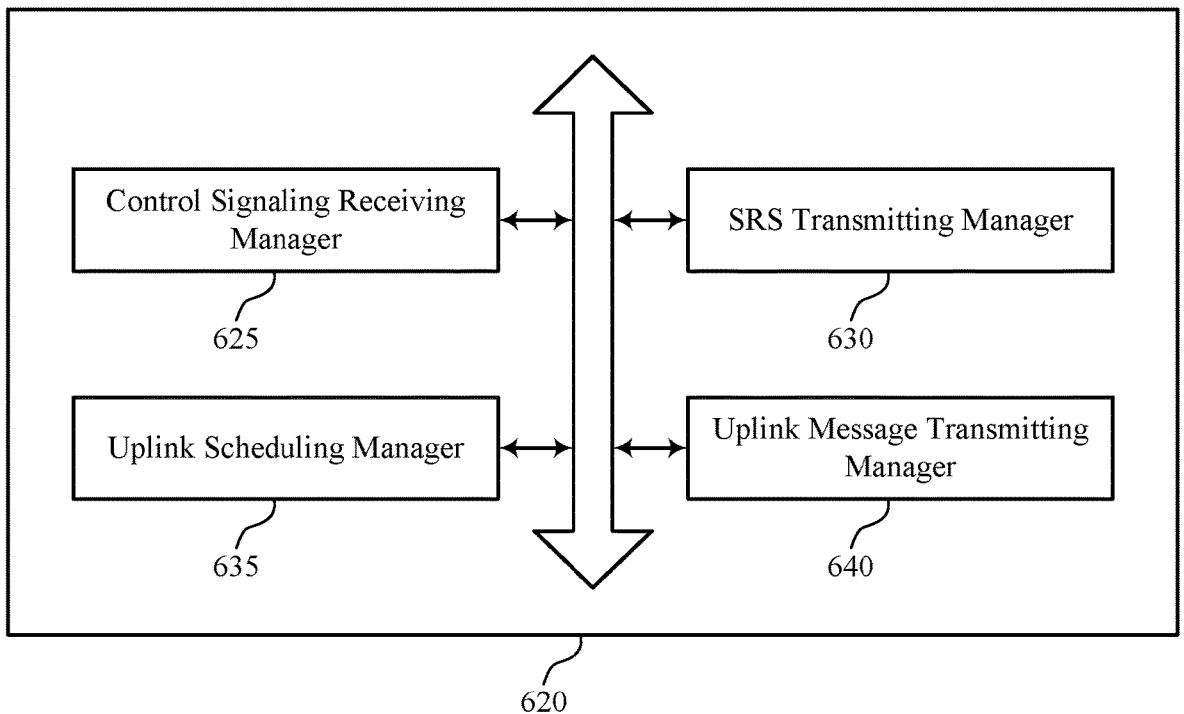
FIG. 6 shows a block diagram of a communications manager that supports techniques for SFN SRS transmission in accordance with one or more aspects of the present disclosure.

FIG. 6 shows a block diagram 600 of a communications manager 620 that supports techniques for SFN SRS transmission in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for SFN SRS transmission as described herein. For example, the communications manager 620 may include a control signaling receiving manager 625, an SRS transmitting manager 630, an uplink scheduling manager 635, an uplink message transmitting manager 640, or any combination thereof. Each of these components may communicate, directly or indirectly, with one another (e.g., via one or more buses).

The control signaling receiving manager 625 may be configured as or otherwise support a means for receiving, from a network entity, first control signaling indicating a SFN configuration associated with a first SRS resource of an SRS resource set, the SFN configuration indicating a set of multiple sets of transmission parameters for SFN transmissions associated with the first SRS resource. The SRS transmitting manager 630 may be configured as or otherwise support a means for transmitting an SRS associated with the first SRS resource in accordance with a first set of transmission parameters indicated by the SFN configuration. In some examples, the SRS transmitting manager 630 may be configured as or otherwise support a means for transmitting the SRS associated with the first SRS resource in accordance with a second set of transmission parameters indicated by the SFN configuration.

In some examples, the SRS transmitting manager 630 may be configured as or otherwise support a means for transmitting a second SRS associated with a second SRS resource of the set of multiple SRS resources in accordance with the first set of transmission parameters of the set of multiple sets of transmission parameters based on the SFN configuration. In some examples, the SRS transmitting manager 630 may be configured as or otherwise support a means for transmitting the second SRS associated with the second SRS resource in accordance with the second set of transmission parameters of the set of multiple sets of transmission parameters based on the SFN configuration.

In some examples, the SRS transmitting manager 630 may be configured as or otherwise support a means for transmitting a second SRS associated with the second SRS resource in accordance with one of the first set of transmission parameters or the second set of transmission parameters.

In some examples, the control signaling receiving manager 625 may be configured as or otherwise support a means for receiving, via the first control signaling, an indication of one or more CSI-RS resources associated with the SRS resource set, where transmitting the SRS is based on the one or more CSI-RS resources.

In some examples, the SRS transmitting manager 630 may be configured as or otherwise support a means for transmitting the SRS in accordance with a first precoder that is based on the one or more CSI-RS resources, where the first set of transmission parameters include the first precoder. In some examples, the SRS transmitting manager 630 may be configured as or otherwise support a means for transmitting the SRS in accordance with a second precoder that is based on the one or more CSI-RS resources, where the second set of transmission parameters include the second precoder.

In some examples, the control signaling receiving manager 625 may be configured as or otherwise support a means for receiving second control signaling scheduling the SRS associated with the first SRS resource, where transmitting the SRS is based on receiving the second control signaling. In some examples, the control signaling receiving manager 625 may be configured as or otherwise support a means for receiving, via the second control signaling, an indication of a first TCI state and a second TCI state, where the first set of transmission parameters includes the first TCI state, and where the second set of transmission parameters includes the second TCI state.

In some examples, the uplink scheduling manager 635 may be configured as or otherwise support a means for receiving, from the network entity based on the SRS, second control signaling scheduling an uplink message associated with the first SRS resource. In some examples, the uplink message transmitting manager 640 may be configured as or otherwise support a means for transmitting the uplink message in accordance with the first set of transmission parameters based on the second control signaling and the SFN configuration. In some examples, the uplink message transmitting manager 640 may be configured as or otherwise support a means for transmitting the uplink message in accordance with the second set of transmission parameters based on the second control signaling and the SFN configuration.

In some examples, the uplink message transmitting manager 640 may be configured as or otherwise support a means for transmitting the uplink message via a first antenna panel in accordance with the first set of transmission parameters. In some examples, the uplink message transmitting manager 640 may be configured as or otherwise support a means for transmitting the uplink message via a second antenna panel in accordance with the second set of transmission parameters.

In some examples, the uplink scheduling manager 635 may be configured as or otherwise support a means for receiving, via the second control signaling, an SRI associated with the first SRS resource, where transmitting the uplink message is based on the SRI. In some examples, the uplink scheduling manager 635 may be configured as or otherwise support a means for receiving, via the second control signaling, a TPMI associated with the uplink message, where the uplink message is transmitted in accordance with the TPMI.

In some examples, the SRS transmitting manager 630 may be configured as or otherwise support a means for transmitting the SRS via a first antenna panel in accordance with the first set of transmission parameters. In some examples, the SRS transmitting manager 630 may be configured as or otherwise support a means for transmitting the SRS via a second antenna panel in accordance with the second set of transmission parameters.

In some examples, the SRS transmitted via a first antenna panel is transmitted to a first TRP associated with the network entity. In some examples, the SRS transmitted via a second antenna panel is transmitted to a second TRP associated with the network entity. In some examples, the first set of transmission parameters, the second set of transmission parameters, or both, include a transmit beam, a TCI state, a precoder, a power control parameter, or any combination thereof.

Figure 7:
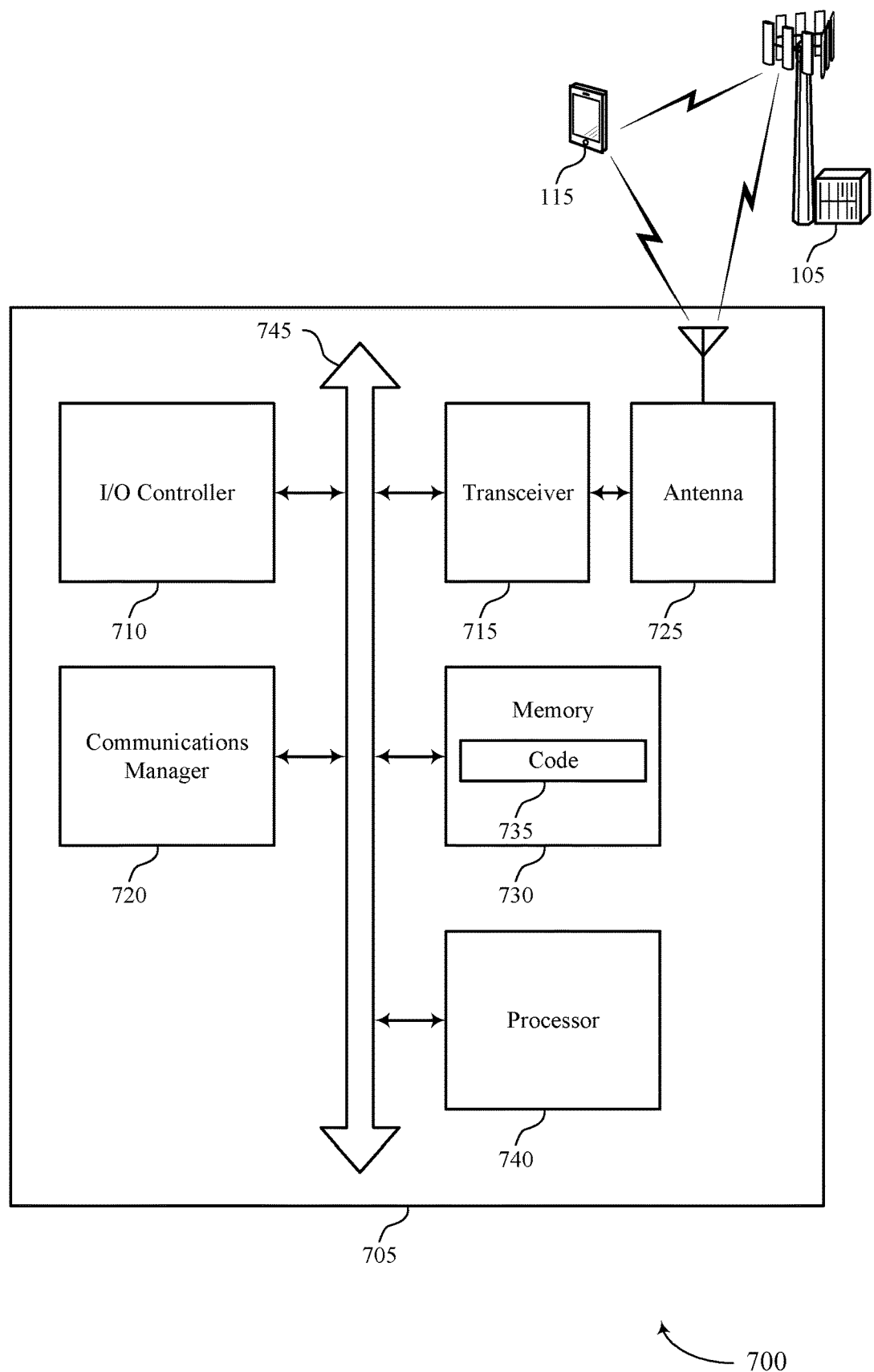
FIG. 7 shows a diagram of a system including a device that supports techniques for SFN SRS transmission in accordance with one or more aspects of the present disclosure.

FIG. 7 shows a diagram of a system 700 including a device 705 that supports techniques for SFN SRS transmission in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for SFN SRS transmission). For example, the device 705 or a component of the device 705 may include a processor 740 and memory 730 coupled with or to the processor 740, the processor 740 and memory 730 configured to perform various functions described herein.

For example, the communications manager 720 may be configured as or otherwise support a means for receiving, from a network entity, first control signaling indicating a SFN configuration associated with a first SRS resource of an SRS resource set, the SFN configuration indicating a set of multiple sets of transmission parameters for SFN transmissions associated with the first SRS resource. The communications manager 720 may be configured as or otherwise support a means for transmitting an SRS associated with the first SRS resource in accordance with a first set of transmission parameters indicated by the SFN configuration. The communications manager 720 may be configured as or otherwise support a means for transmitting the SRS associated with the first SRS resource in accordance with a second set of transmission parameters indicated by the SFN configuration.

By including or configuring the communications manager 720 in accordance with examples as described herein, the device 705 may support techniques that enable UEs 115 to transmit SRSs in an SFNed manner. In other words, techniques described herein may enable wireless devices to transmit an SRS associated with the same SRS resource using multiple sets of Tx parameters. As such, techniques described herein may enable control messages (e.g., DCI messages) which SFNed SRSs and/or uplink messages to indicate fewer sets of SRS resources while still enabling scheduled SRSs/uplink messages to be performed in accordance with multiple sets of Tx parameters, thereby decreasing signaling overhead used to schedule SRSs/uplink messages. Moreover, the use of a single SRS set (or SRS resource) to transmit SFNed SRSs and/or uplink messages may result in more efficient use of resources within the wireless communications system 100.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for SFN SRS transmission as described herein, or the processor 740 and the memory 730 may be otherwise configured to perform or support such operations.

Figure 8:
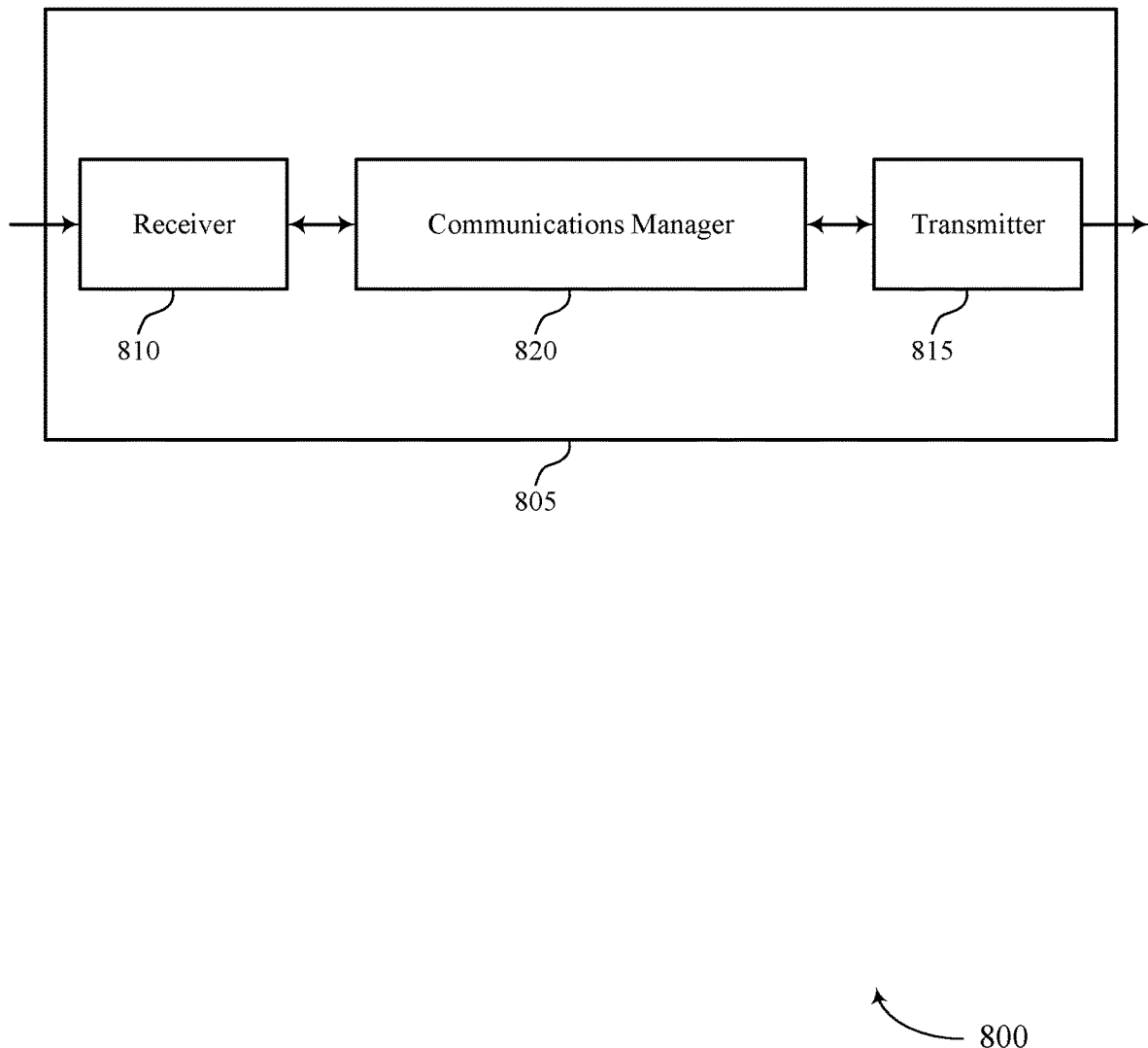
FIGS. 8 and 9 show block diagrams of devices that support techniques for SFN SRS transmission in accordance with one or more aspects of the present disclosure.

FIG. 8 shows a block diagram 800 of a device 805 that supports techniques for SFN SRS transmission in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for SFN SRS transmission as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. For example, the communications manager 820 may be configured as or otherwise support a means for transmitting, to a UE, first control signaling indicating a SFN configuration associated with a first SRS resource of an SRS resource set, the SFN configuration indicating a set of multiple sets of transmission parameters for SFN transmissions associated with the first SRS resource. The communications manager 820 may be configured as or otherwise support a means for receiving, from the UE, an SRS associated with the first SRS resource in accordance with a first set of transmission parameters indicated by the SFN configuration. The communications manager 820 may be configured as or otherwise support a means for receiving, from the UE, the SRS associated with the first SRS resource in accordance with a second set of transmission parameters indicated by the SFN configuration.

By including or configuring the communications manager 820 in accordance with examples as described herein, the device 805 (e.g., a processor controlling or otherwise coupled with the receiver 810, the transmitter 815, the communications manager 820, or a combination thereof) may support techniques that enable UEs 115 to transmit SRSs in an SFNed manner. In other words, techniques described herein may enable wireless devices to an SRS associated with the same SRS resource using multiple sets of Tx parameters. As such, techniques described herein may enable control messages (e.g., DCI messages) which SFNed SRSs and/or uplink messages to indicate fewer sets of SRS resources while still enabling scheduled SRSs/uplink messages to be performed in accordance with multiple sets of Tx parameters, thereby decreasing signaling overhead used to schedule SRSs/uplink messages. Moreover, the use of a single SRS set (or SRS resource) to SFNed SRSs and/or uplink messages may result in more efficient use of resources within the wireless communications system 100.

Figure 9:
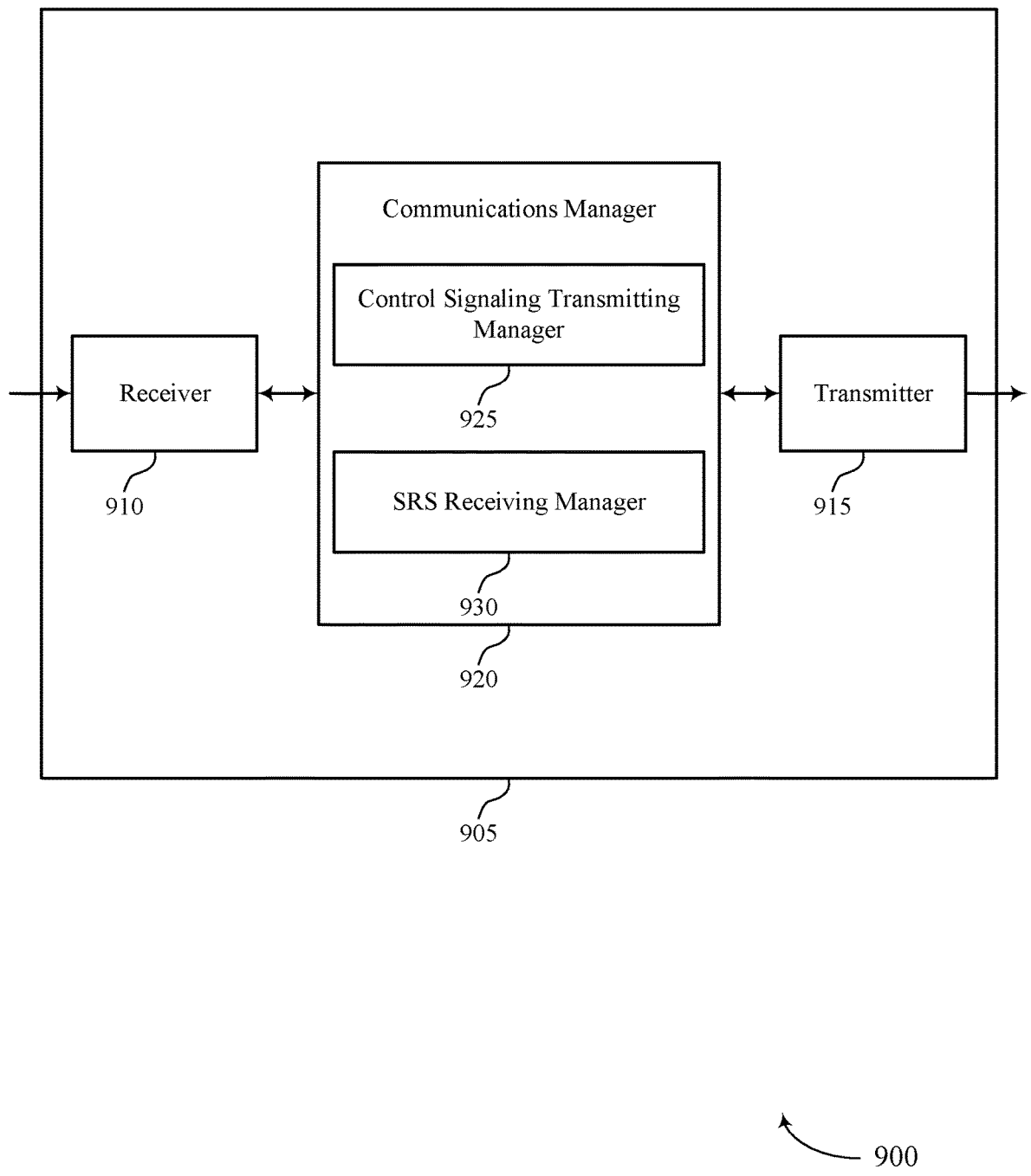

FIG. 9 shows a block diagram 900 of a device 905 that supports techniques for SFN SRS transmission in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for SFN SRS transmission as described herein. For example, the communications manager 920 may include a control signaling transmitting manager 925 an SRS receiving manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The control signaling transmitting manager 925 may be configured as or otherwise support a means for transmitting, to a UE, first control signaling indicating a SFN configuration associated with a first SRS resource of an SRS resource set, the SFN configuration indicating a set of multiple sets of transmission parameters for SFN transmissions associated with the first SRS resource. The SRS receiving manager 930 may be configured as or otherwise support a means for receiving, from the UE, an SRS associated with the first SRS resource in accordance with a first set of transmission parameters indicated by the SFN configuration. The SRS receiving manager 930 may be configured as or otherwise support a means for receiving, from the UE, the SRS associated with the first SRS resource in accordance with a second set of transmission parameters indicated by the SFN configuration.

Figure 10:
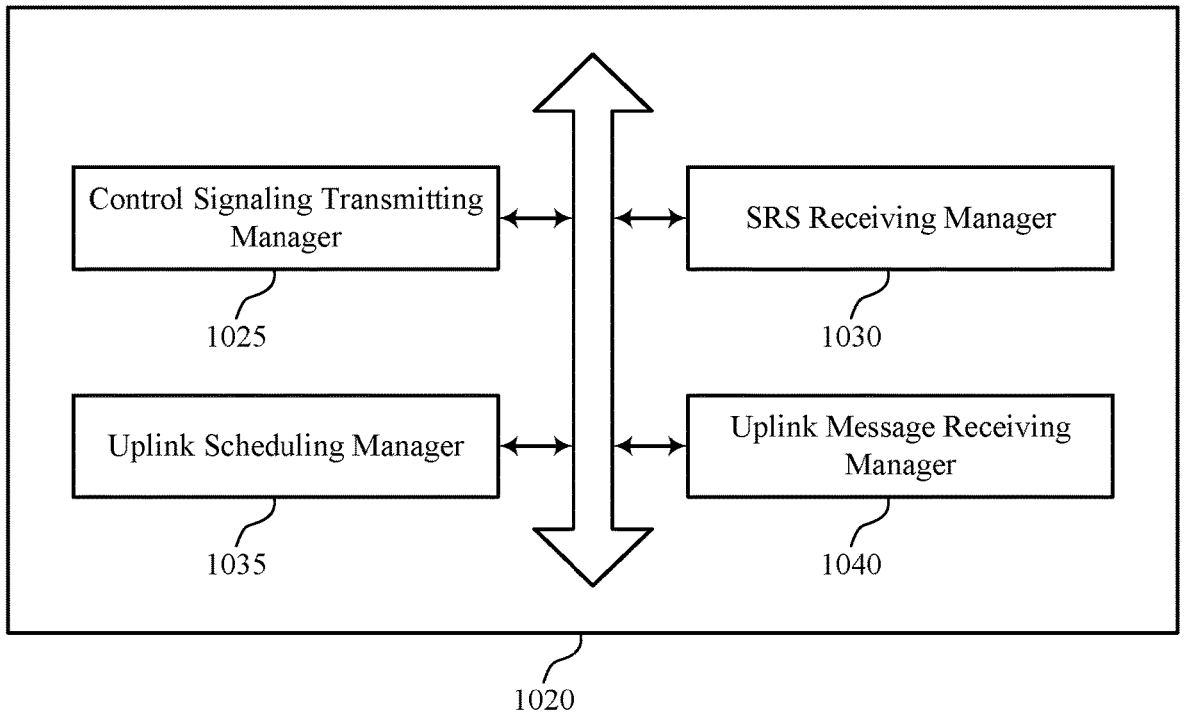
FIG. 10 shows a block diagram of a communications manager that supports techniques for SFN SRS transmission in accordance with one or more aspects of the present disclosure.

FIG. 10 shows a block diagram 1000 of a communications manager 1020 that supports techniques for SFN SRS transmission in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for SFN SRS transmission as described herein. For example, the communications manager 1020 may include a control signaling transmitting manager 1025, an SRS receiving manager 1030, an uplink scheduling manager 1035, an uplink message receiving manager 1040, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity in accordance with examples as disclosed herein. The control signaling transmitting manager 1025 may be configured as or otherwise support a means for transmitting, to a UE, first control signaling indicating a SFN configuration associated with a first SRS resource of an SRS resource set, the SFN configuration indicating a set of multiple sets of transmission parameters for SFN transmissions associated with the first SRS resource. The SRS receiving manager 1030 may be configured as or otherwise support a means for receiving, from the UE, an SRS associated with the first SRS resource in accordance with a first set of transmission parameters indicated by the SFN configuration. In some examples, the SRS receiving manager 1030 may be configured as or otherwise support a means for receiving, from the UE, the SRS associated with the first SRS resource in accordance with a second set of transmission parameters indicated by the SFN configuration.

In some examples, the SFN configuration is associated with a set of multiple SRS resources of the SRS resource set, and the SRS receiving manager 1030 may be configured as or otherwise support a means for receiving a second SRS associated with a second SRS resource of the set of multiple SRS resources in accordance with the first set of transmission parameters of the set of multiple sets of transmission parameters based on the SFN configuration. In some examples, the SFN configuration is associated with a set of multiple SRS resources of the SRS resource set, and the SRS receiving manager 1030 may be configured as or otherwise support a means for receiving the second SRS associated with the second SRS resource in accordance with the second set of transmission parameters of the set of multiple sets of transmission parameters based on the SFN configuration.

In some examples, the SRS resource set includes at least the first SRS resource and a second SRS resource, and the SRS receiving manager 1030 may be configured as or otherwise support a means for receiving a second SRS associated with the second SRS resource in accordance with one of the first set of transmission parameters or the second set of transmission parameters.

In some examples, the control signaling transmitting manager 1025 may be configured as or otherwise support a means for transmitting, via the first control signaling, an indication of one or more CSI-RS resources associated with the SRS resource set, where receiving the SRS is based on the one or more CSI-RS resources.

In some examples, the SRS receiving manager 1030 may be configured as or otherwise support a means for receiving the SRS in accordance with a first precoder that is based on the one or more CSI-RS resources, where the first set of transmission parameters include the first precoder. In some examples, the SRS receiving manager 1030 may be configured as or otherwise support a means for receiving the SRS in accordance with a second precoder that is based on the one or more CSI-RS resources, where the second set of transmission parameters include the second precoder.

In some examples, the control signaling transmitting manager 1025 may be configured as or otherwise support a means for transmitting, to the UE, second control signaling scheduling the SRS associated with the first SRS resource, where receiving the SRS is based on transmitting the second control signaling. In some examples, the control signaling transmitting manager 1025 may be configured as or otherwise support a means for transmitting, via the second control signaling, an indication of a first TCI state and a second TCI state, where the first set of transmission parameters includes the first TCI state, and where the second set of transmission parameters includes the second TCI state.

In some examples, the uplink scheduling manager 1035 may be configured as or otherwise support a means for transmitting, to the UE based on the SRS, second control signaling scheduling an uplink message associated with the first SRS resource. In some examples, the uplink message receiving manager 1040 may be configured as or otherwise support a means for receiving the uplink message in accordance with the first set of transmission parameters based on the second control signaling and the SFN configuration. In some examples, the uplink message receiving manager 1040 may be configured as or otherwise support a means for receiving the uplink message in accordance with the second set of transmission parameters based on the second control signaling and the SFN configuration.

In some examples, the uplink message receiving manager 1040 may be configured as or otherwise support a means for receiving the uplink message via a first antenna panel in accordance with the first set of transmission parameters. In some examples, the uplink message receiving manager 1040 may be configured as or otherwise support a means for receiving the uplink message via a second antenna panel in accordance with the second set of transmission parameters.

In some examples, the uplink scheduling manager 1035 may be configured as or otherwise support a means for transmitting, via the second control signaling, an SRI associated with the first SRS resource, where receiving the uplink message is based on the SRI. In some examples, the uplink scheduling manager 1035 may be configured as or otherwise support a means for transmitting, via the second control signaling, a TPMI associated with the uplink message, where the uplink message is received in accordance with the TPMI.

In some examples, the SRS receiving manager 1030 may be configured as or otherwise support a means for receiving the SRS in accordance with the first set of transmission parameters via a first TRP. In some examples, the SRS receiving manager 1030 may be configured as or otherwise support a means for receiving the SRS in accordance with the second set of transmission parameters via a second TRP. In some examples, the first set of transmission parameters, the second set of transmission parameters, or both, include a transmit beam, a TCI state, a precoder, a power control parameter, or any combination thereof.

Figure 11:
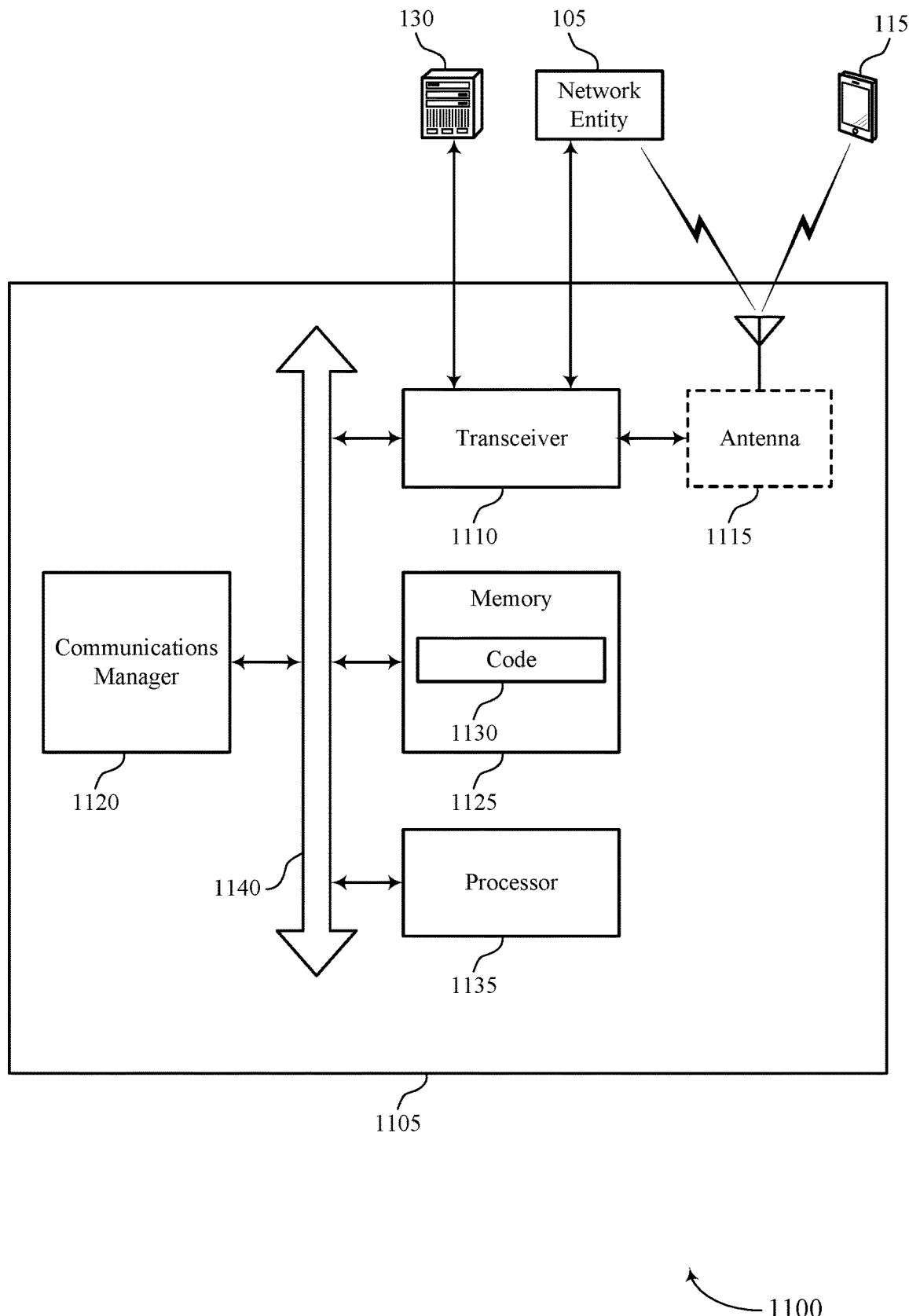
FIG. 11 shows a diagram of a system including a device that supports techniques for SFN SRS transmission in accordance with one or more aspects of the present disclosure.

FIG. 11 shows a diagram of a system 1100 including a device 1105 that supports techniques for SFN SRS transmission in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting techniques for SFN SRS transmission). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1105 may transmit information output from the chip or modem. In some implementations, the second interface may refer to an interface between the processing system of the chip or modem and a receiver, such that the device 1105 may obtain information or signal inputs, and the information may be passed to the processing system. A person having ordinary skill in the art will readily recognize that the first interface also may obtain information or signal inputs, and the second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity in accordance with examples as disclosed herein. For example, the communications manager 1120 may be configured as or otherwise support a means for transmitting, to a UE, first control signaling indicating a SFN configuration associated with a first SRS resource of an SRS resource set, the SFN configuration indicating a set of multiple sets of transmission parameters for SFN transmissions associated with the first SRS resource. The communications manager 1120 may be configured as or otherwise support a means for receiving, from the UE, an SRS associated with the first SRS resource in accordance with a first set of transmission parameters indicated by the SFN configuration. The communications manager 1120 may be configured as or otherwise support a means for receiving, from the UE, the SRS associated with the first SRS resource in accordance with a second set of transmission parameters indicated by the SFN configuration.

By including or configuring the communications manager 1120 in accordance with examples as described herein, the device 1105 may support techniques that enable UEs 115 to transmit SRSs in an SFNed manner. In other words, techniques described herein may enable wireless devices to an SRS associated with the same SRS resource using multiple sets of Tx parameters. As such, techniques described herein may enable control messages (e.g., DCI messages) which SFNed SRSs and/or uplink messages to indicate fewer sets of SRS resources while still enabling scheduled SRSs/uplink messages to be performed in accordance with multiple sets of Tx parameters, thereby decreasing signaling overhead used to schedule SRSs/uplink messages. Moreover, the use of a single SRS set (or SRS resource) to transmit SFNed SRSs and/or uplink messages may result in more efficient use of resources within the wireless communications system 100.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of techniques for SFN SRS transmission as described herein, or the processor 1135 and the memory 1125 may be otherwise configured to perform or support such operations.

Figure 12:
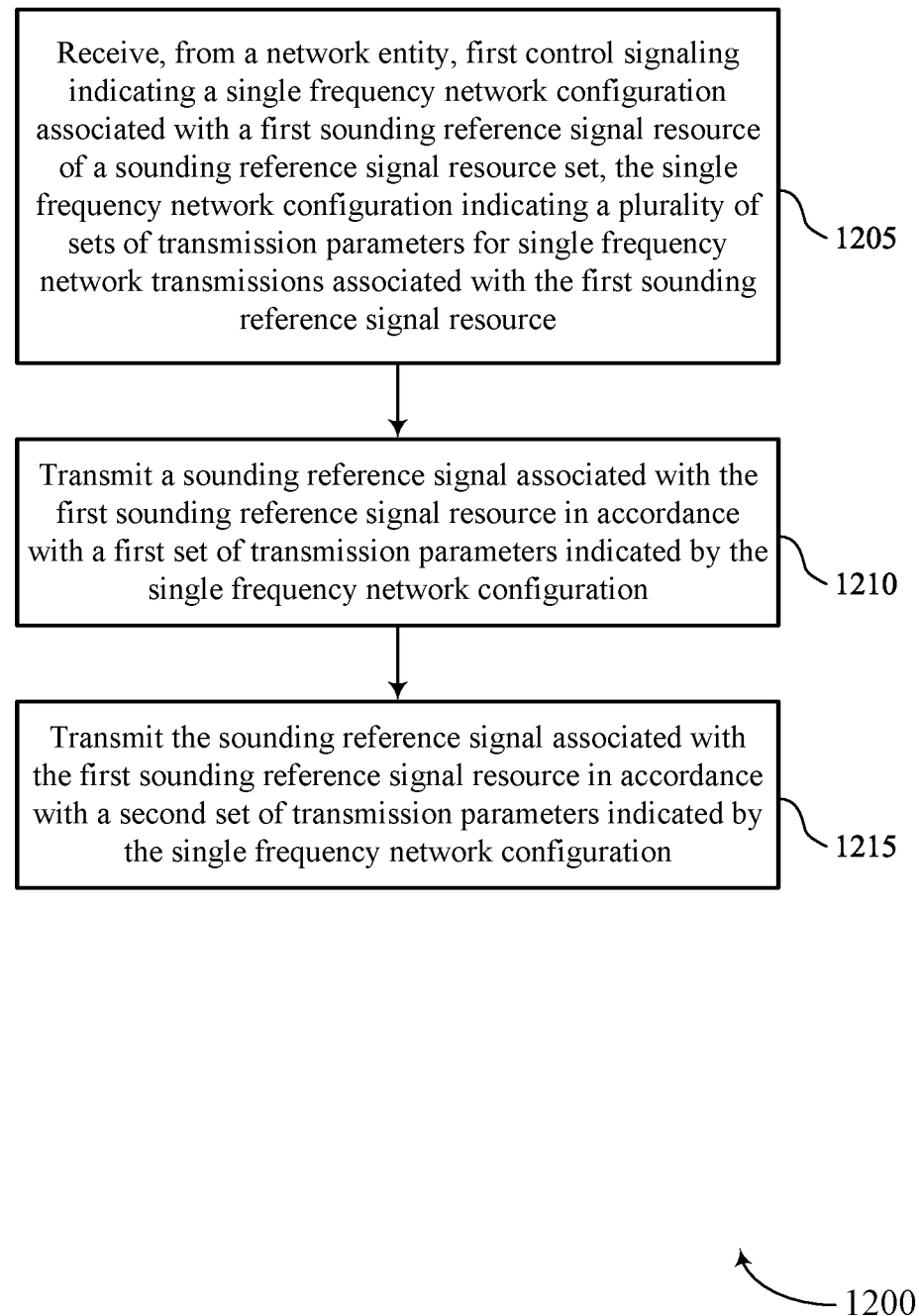
FIGS. 12 through 15 show flowcharts illustrating methods that support techniques for SFN SRS transmission in accordance with one or more aspects of the present disclosure.

FIG. 12 shows a flowchart illustrating a method 1200 that supports techniques for SFN SRS transmission in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, from a network entity, first control signaling indicating a SFN configuration associated with a first SRS resource of an SRS resource set, the SFN configuration indicating a set of multiple sets of transmission parameters for SFN transmissions associated with the first SRS resource. The operations of 1205 may be performed in accordance with examples as disclosed herein. In some examples, aspects of the operations of 1205 may be performed by a control signaling receiving manager 625 as described with reference to FIG. 6.

At 1210, the method may include transmitting an SRS associated with the first SRS resource in accordance with a first set of transmission parameters indicated by the SFN configuration. The operations of 1210 may be performed in accordance with examples as disclosed herein. In some examples, aspects of the operations of 1210 may be performed by an SRS transmitting manager 630 as described with reference to FIG. 6.

At 1215, the method may include transmitting the SRS associated with the first SRS resource in accordance with a second set of transmission parameters indicated by the SFN configuration. The operations of 1215 may be performed in accordance with examples as disclosed herein. In some examples, aspects of the operations of 1215 may be performed by an SRS transmitting manager 630 as described with reference to FIG. 6.

Figure 13:
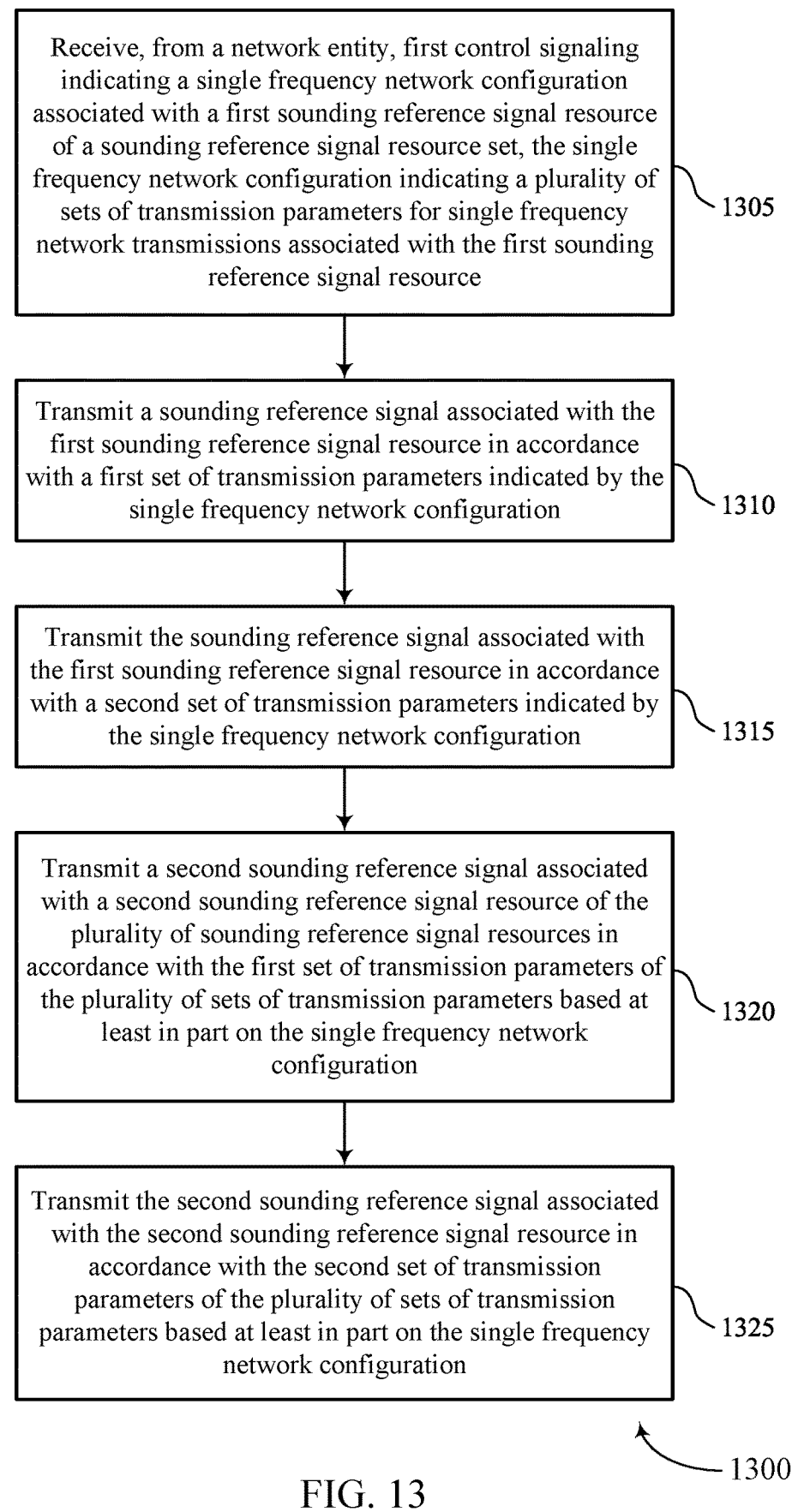

FIG. 13 shows a flowchart illustrating a method 1300 that supports techniques for SFN SRS transmission in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, first control signaling indicating a SFN configuration associated with a first SRS resource of an SRS resource set, the SFN configuration indicating a set of multiple sets of transmission parameters for SFN transmissions associated with the first SRS resource. The operations of 1305 may be performed in accordance with examples as disclosed herein. In some examples, aspects of the operations of 1305 may be performed by a control signaling receiving manager 625 as described with reference to FIG. 6.

At 1310, the method may include transmitting an SRS associated with the first SRS resource in accordance with a first set of transmission parameters indicated by the SFN configuration. The operations of 1310 may be performed in accordance with examples as disclosed herein. In some examples, aspects of the operations of 1310 may be performed by an SRS transmitting manager 630 as described with reference to FIG. 6.

At 1315, the method may include transmitting the SRS associated with the first SRS resource in accordance with a second set of transmission parameters indicated by the SFN configuration. The operations of 1315 may be performed in accordance with examples as disclosed herein. In some examples, aspects of the operations of 1315 may be performed by an SRS transmitting manager 630 as described with reference to FIG. 6.

At 1320, the method may include transmitting a second SRS associated with a second SRS resource of the set of multiple SRS resources in accordance with the first set of transmission parameters of the set of multiple sets of transmission parameters based on the SFN configuration. The operations of 1320 may be performed in accordance with examples as disclosed herein. In some examples, aspects of the operations of 1320 may be performed by an SRS transmitting manager 630 as described with reference to FIG. 6.

At 1325, the method may include transmitting the second SRS associated with the second SRS resource in accordance with the second set of transmission parameters of the set of multiple sets of transmission parameters based on the SFN configuration. The operations of 1325 may be performed in accordance with examples as disclosed herein. In some examples, aspects of the operations of 1325 may be performed by an SRS transmitting manager 630 as described with reference to FIG. 6.

Figure 14:
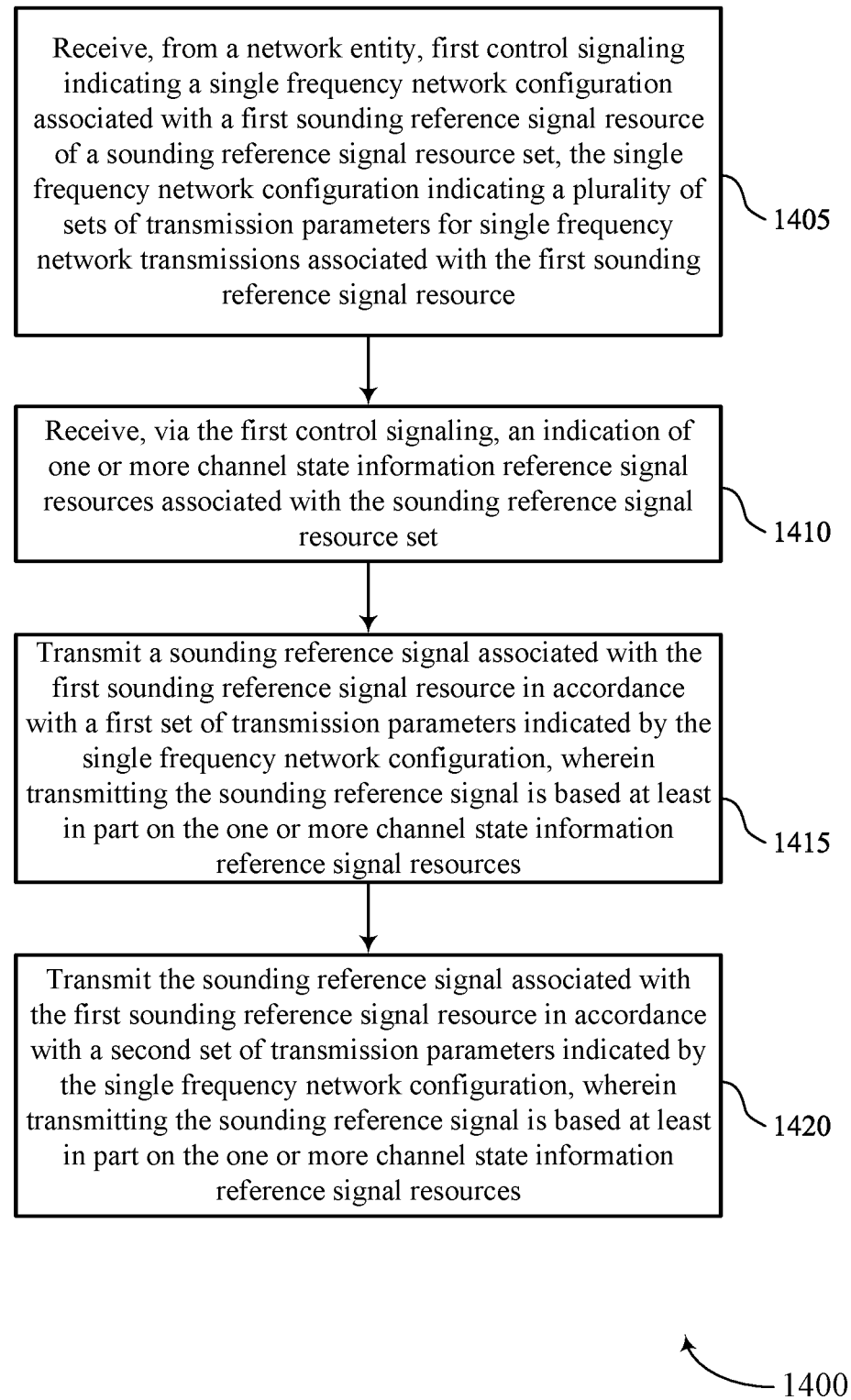

FIG. 14 shows a flowchart illustrating a method 1400 that supports techniques for SFN SRS transmission in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, first control signaling indicating a SFN configuration associated with a first SRS resource of an SRS resource set, the SFN configuration indicating a set of multiple sets of transmission parameters for SFN transmissions associated with the first SRS resource. The operations of 1405 may be performed in accordance with examples as disclosed herein. In some examples, aspects of the operations of 1405 may be performed by a control signaling receiving manager 625 as described with reference to FIG. 6.

At 1410, the method may include receiving, via the first control signaling, an indication of one or more CSI-RS resources associated with the SRS resource set. The operations of 1410 may be performed in accordance with examples as disclosed herein. In some examples, aspects of the operations of 1410 may be performed by a control signaling receiving manager 625 as described with reference to FIG. 6.

At 1415, the method may include transmitting an SRS associated with the first SRS resource in accordance with a first set of transmission parameters indicated by the SFN configuration, where transmitting the SRS is based on the one or more CSI-RS resources. The operations of 1415 may be performed in accordance with examples as disclosed herein. In some examples, aspects of the operations of 1415 may be performed by an SRS transmitting manager 630 as described with reference to FIG. 6.

At 1420, the method may include transmitting the SRS associated with the first SRS resource in accordance with a second set of transmission parameters indicated by the SFN configuration, where transmitting the SRS is based on the one or more CSI-RS resources. The operations of 1420 may be performed in accordance with examples as disclosed herein. In some examples, aspects of the operations of 1420 may be performed by an SRS transmitting manager 630 as described with reference to FIG. 6.

Figure 15:
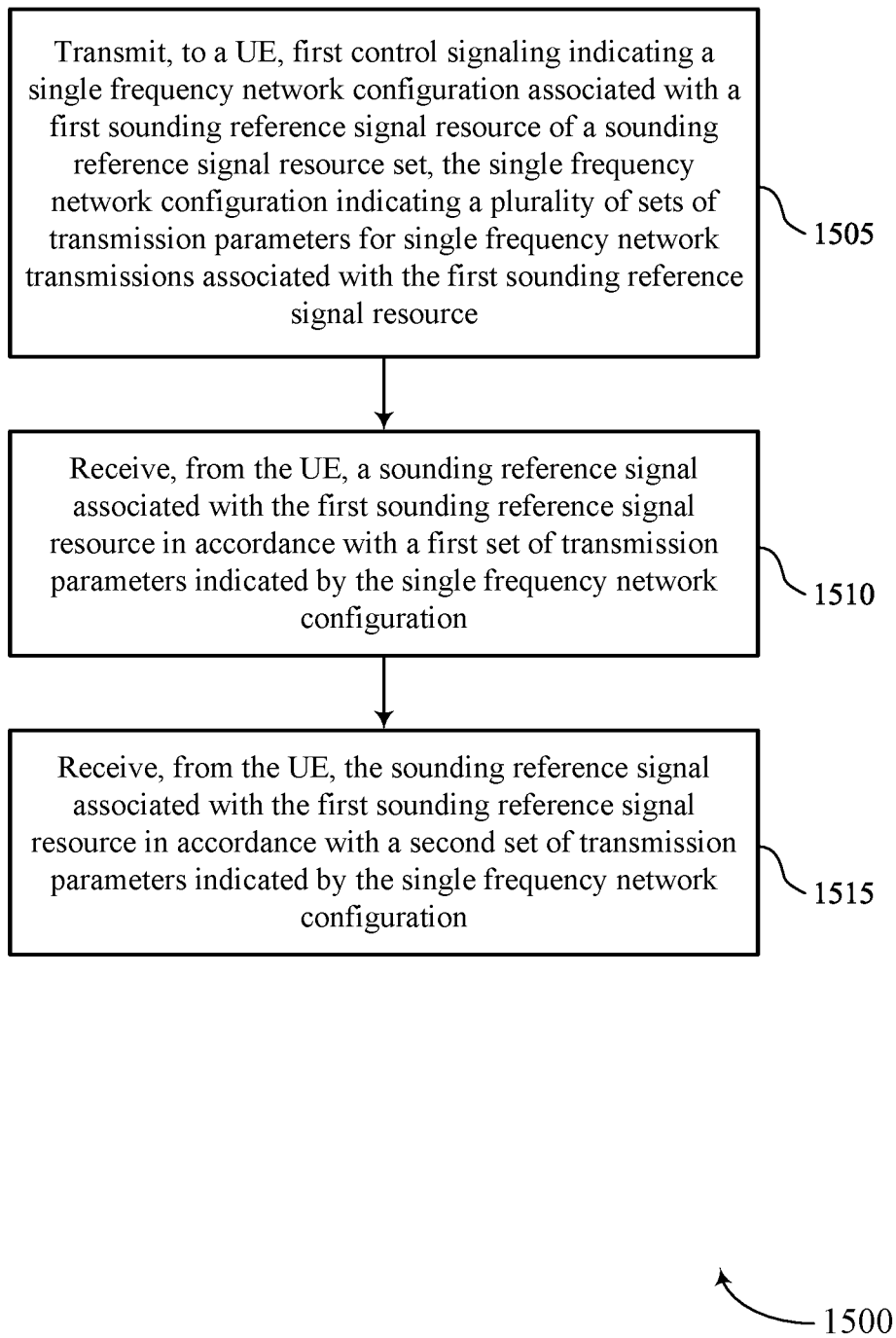

FIG. 15 shows a flowchart illustrating a method 1500 that supports techniques for SFN SRS transmission in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, first control signaling indicating a SFN configuration associated with a first SRS resource of an SRS resource set, the SFN configuration indicating a set of multiple sets of transmission parameters for SFN transmissions associated with the first SRS resource. The operations of 1505 may be performed in accordance with examples as disclosed herein. In some examples, aspects of the operations of 1505 may be performed by a control signaling transmitting manager 1025 as described with reference to FIG. 10.

At 1510, the method may include receiving, from the UE, an SRS associated with the first SRS resource in accordance with a first set of transmission parameters indicated by the SFN configuration. The operations of 1510 may be performed in accordance with examples as disclosed herein. In some examples, aspects of the operations of 1510 may be performed by an SRS receiving manager 1030 as described with reference to FIG. 10.

At 1515, the method may include receiving, from the UE, the SRS associated with the first SRS resource in accordance with a second set of transmission parameters indicated by the SFN configuration. The operations of 1515 may be performed in accordance with examples as disclosed herein. In some examples, aspects of the operations of 1515 may be performed by an SRS receiving manager 1030 as described with reference to FIG. 10.

The following provides an overview of aspects of the present disclosure:

Aspect 1: A method for wireless communication at a UE, comprising: receiving, from a network entity, first control signaling indicating an SFN configuration associated with a first SRS resource of an SRS resource set, the SFN configuration indicating a plurality of sets of transmission parameters for SFN transmissions associated with the first SRS resource; transmitting an SRS associated with the first SRS resource in accordance with a first set of transmission parameters indicated by the SFN configuration; and transmitting the SRS associated with the first SRS resource in accordance with a second set of transmission parameters indicated by the SFN configuration.

Aspect 2: The method of aspect 1, wherein the SFN configuration is associated with a plurality of SRS resources of the SRS resource set, the plurality of SRS resources including the first SRS resource, the method further comprising: transmitting a second SRS associated with a second SRS resource of the plurality of SRS resources in accordance with the first set of transmission parameters of the plurality of sets of transmission parameters based at least in part on the SFN configuration; and transmitting the second SRS associated with the second SRS resource in accordance with the second set of transmission parameters of the plurality of sets of transmission parameters based at least in part on the SFN configuration.

Aspect 3: The method of any of aspects 1 through 2, wherein the SRS resource set comprises at least the first SRS resource and a second SRS resource, wherein the SFN configuration is not associated with the second SRS resource, the method further comprising: transmitting a second SRS associated with the second SRS resource in accordance with one of the first set of transmission parameters or the second set of transmission parameters.

Aspect 4: The method of any of aspects 1 through 3, further comprising: receiving, via the first control signaling, an indication of one or more CSI-RS resources associated with the SRS resource set, wherein transmitting the SRS is based at least in part on the one or more CSI-RS resources.

Aspect 5: The method of aspect 4, further comprising: transmitting the SRS in accordance with a first precoder that is based at least in part on the one or more CSI-RS resources, wherein the first set of transmission parameters comprise the first precoder; and transmitting the SRS in accordance with a second precoder that is based at least in part on the one or more CSI-RS resources, wherein the second set of transmission parameters comprise the second precoder.

Aspect 6: The method of any of aspects 1 through 5, further comprising: receiving second control signaling scheduling the SRS associated with the first SRS resource, wherein transmitting the SRS is based at least in part on receiving the second control signaling.

Aspect 7: The method of aspect 6, further comprising: receiving, via the second control signaling, an indication of a first TCI state and a second TCI state, wherein the first set of transmission parameters comprises the first TCI state, and wherein the second set of transmission parameters comprises the second TCI state.

Aspect 8: The method of any of aspects 1 through 7, further comprising: receiving, from the network entity based at least in part on the SRS, second control signaling scheduling an uplink message associated with the first SRS resource; transmitting the uplink message in accordance with the first set of transmission parameters based at least in part on the second control signaling and the SFN configuration; and transmitting the uplink message in accordance with the second set of transmission parameters based at least in part on the second control signaling and the SFN configuration.

Aspect 9: The method of aspect 8, further comprising: transmitting the uplink message via a first antenna panel in accordance with the first set of transmission parameters; and transmitting the uplink message via a second antenna panel in accordance with the second set of transmission parameters.

Aspect 10: The method of any of aspects 8 through 9, further comprising: receiving, via the second control signaling, an SRI associated with the first SRS resource, wherein transmitting the uplink message is based at least in part on the SRI.

Aspect 11: The method of any of aspects 8 through 10, further comprising: receiving, via the second control signaling, a TPMI associated with the uplink message, wherein the uplink message is transmitted in accordance with the TPMI.

Aspect 12: The method of any of aspects 1 through 11, further comprising: transmitting the SRS via a first antenna panel in accordance with the first set of transmission parameters; and transmitting the SRS via a second antenna panel in accordance with the second set of transmission parameters.

Aspect 13: The method of aspect 12, wherein the SRS transmitted via a first antenna panel is transmitted to a first transmission reception point associated with the network entity, and the SRS transmitted via a second antenna panel is transmitted to a second transmission reception point associated with the network entity.

Aspect 14: The method of any of aspects 1 through 13, wherein the first set of transmission parameters, the second set of transmission parameters, or both, comprise a transmit beam, a TCI state, a precoder, a power control parameter, or any combination thereof.

Aspect 15: A method for wireless communication at a network entity, comprising: transmitting, to a UE, first control signaling indicating an SFN configuration associated with a first SRS resource of an SRS resource set, the SFN configuration indicating a plurality of sets of transmission parameters for SFN transmissions associated with the first SRS resource; receiving, from the UE, an SRS associated with the first SRS resource in accordance with a first set of transmission parameters indicated by the SFN configuration; and receiving, from the UE, the SRS associated with the first SRS resource in accordance with a second set of transmission parameters indicated by the SFN configuration.

Aspect 16: The method of aspect 15, wherein the SFN configuration is associated with a plurality of SRS resources of the SRS resource set, the plurality of SRS resources including the first SRS resource, the method further comprising: receiving a second SRS associated with a second SRS resource of the plurality of SRS resources in accordance with the first set of transmission parameters of the plurality of sets of transmission parameters based at least in part on the SFN configuration; and receiving the second SRS associated with the second SRS resource in accordance with the second set of transmission parameters of the plurality of sets of transmission parameters based at least in part on the SFN configuration.

Aspect 17: The method of any of aspects 15 through 16, wherein the SRS resource set comprises at least the first SRS resource and a second SRS resource, wherein the SFN configuration is not associated with the second SRS resource, the method further comprising: receiving a second SRS associated with the second SRS resource in accordance with one of the first set of transmission parameters or the second set of transmission parameters.

Aspect 18: The method of any of aspects 15 through 17, further comprising: transmitting, via the first control signaling, an indication of one or more CSI-RS resources associated with the SRS resource set, wherein receiving the SRS is based at least in part on the one or more CSI-RS resources.

Aspect 19: The method of aspect 18, further comprising: receiving the SRS in accordance with a first precoder that is based at least in part on the one or more CSI-RS resources, wherein the first set of transmission parameters comprise the first precoder; and receiving the SRS in accordance with a second precoder that is based at least in part on the one or more CSI-RS resources, wherein the second set of transmission parameters comprise the second precoder.

Aspect 20: The method of any of aspects 15 through 19, further comprising: transmitting, to the UE, second control signaling scheduling the SRS associated with the first SRS resource, wherein receiving the SRS is based at least in part on transmitting the second control signaling.

Aspect 21: The method of aspect 20, further comprising: transmitting, via the second control signaling, an indication of a first TCI state and a second TCI state, wherein the first set of transmission parameters comprises the first TCI state, and wherein the second set of transmission parameters comprises the second TCI state.

Aspect 22: The method of any of aspects 15 through 21, further comprising: transmitting, to the UE based at least in part on the SRS, second control signaling scheduling an uplink message associated with the first SRS resource; receiving the uplink message in accordance with the first set of transmission parameters based at least in part on the second control signaling and the SFN configuration; and receiving the uplink message in accordance with the second set of transmission parameters based at least in part on the second control signaling and the SFN configuration.

Aspect 23: The method of aspect 22, further comprising: receiving the uplink message via a first antenna panel in accordance with the first set of transmission parameters; and receiving the uplink message via a second antenna panel in accordance with the second set of transmission parameters.

Aspect 24: The method of any of aspects 22 through 23, further comprising: transmitting, via the second control signaling, an SRI associated with the first SRS resource, wherein receiving the uplink message is based at least in part on the SRI.

Aspect 25: The method of any of aspects 22 through 24, further comprising: transmitting, via the second control signaling, a TPMI associated with the uplink message, wherein the uplink message is received in accordance with the TPMI.

Aspect 26: The method of any of aspects 15 through 25, further comprising: receiving the SRS in accordance with the first set of transmission parameters via a first transmission reception point; and receiving the SRS in accordance with the second set of transmission parameters via a second transmission reception point.

Aspect 27: The method of any of aspects 15 through 26, wherein the first set of transmission parameters, the second set of transmission parameters, or both, comprise a transmit beam, a TCI state, a precoder, a power control parameter, or any combination thereof.

Aspect 28: An apparatus comprising a processor; memory coupled with the processor; and instructions stored in the memory and executable by the processor to cause the apparatus to perform a method of any of aspects 1 through 14.

Aspect 29: An apparatus comprising at least one means for performing a method of any of aspects 1 through 14.

Aspect 30: A non-transitory computer-readable medium storing code the code comprising instructions executable by a processor to perform a method of any of aspects 1 through 14.

Aspect 31: An apparatus for wireless communication at a network entity, comprising a processor; memory coupled with the processor; and instructions stored in the memory and executable by the processor to cause the apparatus to perform a method of any of aspects 15 through 27.

Aspect 32: An apparatus for wireless communication at a network entity, comprising at least one means for performing a method of any of aspects 15 through 27.

Aspect 33: A non-transitory computer-readable medium storing code for wireless communication at a network entity, the code comprising instructions executable by a processor to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   one or more processors;
   one or more memories coupled with the one or more processors; and
   instructions stored in the one or more memories and executable by the one or more processors to cause the apparatus to:
   receive, from a network entity, first control signaling indicating a single frequency network configuration associated with a first sounding reference signal resource of a sounding reference signal resource set, the single frequency network configuration indicating a plurality of sets of transmission parameters for single frequency network transmissions associated with the first sounding reference signal resource;
   receive second control signaling scheduling a sounding reference signal associated with the first sounding reference signal resource, the second control signaling indicating a first set of transmission parameters and a second set of transmission parameters from the plurality of sets of transmission parameters indicated by the single frequency network configuration;
   transmit the sounding reference signal associated with the first sounding reference signal resource in accordance with the first set of transmission parameters indicated by the single frequency network configuration and based at least in part on receiving the second control signaling; and
   transmit the sounding reference signal associated with the first sounding reference signal resource in accordance with the second set of transmission parameters indicated by the single frequency network configuration and based at least in part on receiving the second control signaling.

2. The apparatus of claim 1, wherein the single frequency network configuration is associated with a plurality of sounding reference signal resources of the sounding reference signal resource set, the plurality of sounding reference signal resources including the first sounding reference signal resource, wherein the instructions are further executable by the one or more processors to cause the apparatus to:
transmit a second sounding reference signal associated with a second sounding reference signal resource of the plurality of sounding reference signal resources in accordance with the first set of transmission parameters of the plurality of sets of transmission parameters based at least in part on the single frequency network configuration; and
transmit the second sounding reference signal associated with the second sounding reference signal resource in accordance with the second set of transmission parameters of the plurality of sets of transmission parameters based at least in part on the single frequency network configuration.

3. The apparatus of claim 1, wherein the sounding reference signal resource set comprises at least the first sounding reference signal resource and a second sounding reference signal resource, wherein the single frequency network configuration is not associated with the second sounding reference signal resource, wherein the instructions are executable by the one or more processors to cause the apparatus to:
transmit a second sounding reference signal associated with the second sounding reference signal resource in accordance with one of the first set of transmission parameters or the second set of transmission parameters.

4. The apparatus of claim 1, wherein the instructions are further executable by the one or more processors to cause the apparatus to:
receive, via the first control signaling, an indication of one or more channel state information reference signal resources associated with the sounding reference signal resource set, wherein transmitting the sounding reference signal is based at least in part on the one or more channel state information reference signal resources.

5. The apparatus of claim 4, wherein the instructions are further executable by the one or more processors to cause the apparatus to:
transmit the sounding reference signal in accordance with a first precoder that is based at least in part on the one or more channel state information reference signal resources, wherein the first set of transmission parameters comprise the first precoder; and
transmit the sounding reference signal in accordance with a second precoder that is based at least in part on the one or more channel state information reference signal resources, wherein the second set of transmission parameters comprise the second precoder.

6. The apparatus of claim 1, wherein the instructions are further executable by the one or more processors to cause the apparatus to:
receive, via the second control signaling, an indication of a first transmission configuration indicator state and a second transmission configuration indicator state, wherein the first set of transmission parameters comprises the first transmission configuration indicator state, and wherein the second set of transmission parameters comprises the second transmission configuration indicator state.

7. The apparatus of claim 1, wherein the instructions are further executable by the one or more processors to cause the apparatus to:
receive, from the network entity based at least in part on the sounding reference signal, the second control signaling, the second control signaling scheduling an uplink message associated with the first sounding reference signal resource;
transmit the uplink message in accordance with the first set of transmission parameters based at least in part on the second control signaling and the single frequency network configuration; and
transmit the uplink message in accordance with the second set of transmission parameters based at least in part on the second control signaling and the single frequency network configuration.

8. The apparatus of claim 7, wherein the instructions are further executable by the one or more processors to cause the apparatus to:
transmit the uplink message via a first antenna panel in accordance with the first set of transmission parameters; and
transmit the uplink message via a second antenna panel in accordance with the second set of transmission parameters.

9. The apparatus of claim 7, wherein the instructions are further executable by the one or more processors to cause the apparatus to:
receive, via the second control signaling, a sounding reference signal resource indicator associated with the first sounding reference signal resource, wherein transmitting the uplink message is based at least in part on the sounding reference signal resource indicator.

10. The apparatus of claim 7, wherein the instructions are further executable by the one or more processors to cause the apparatus to:
receive, via the second control signaling, a transmit precoding matrix indicator associated with the uplink message, wherein the uplink message is transmitted in accordance with the transmit precoding matrix indicator.

11. The apparatus of claim 1, wherein the instructions are further executable by the one or more processors to cause the apparatus to:
transmit the sounding reference signal via a first antenna panel in accordance with the first set of transmission parameters; and
transmit the sounding reference signal via a second antenna panel in accordance with the second set of transmission parameters.

12. The apparatus of claim 11, wherein the sounding reference signal transmitted via the first antenna panel is transmitted to a first transmission reception point associated with the network entity, and wherein the sounding reference signal transmitted via the second antenna panel is transmitted to a second transmission reception point associated with the network entity.

13. The apparatus of claim 1, wherein the first set of transmission parameters, the second set of transmission parameters, or both, comprise a transmit beam, a transmission configuration indicator state, a precoder, a power control parameter, or any combination thereof.

14. An apparatus for wireless communication at a network entity, comprising:
one or more processors;
one or more memories coupled with the one or more processors; and
instructions stored in the one or more memories and executable by the one or more processors to cause the apparatus to:
transmit, to a user equipment (UE), first control signaling indicating a single frequency network configuration associated with a first sounding reference signal resource of a sounding reference signal resource set, the single frequency network configuration indicating a plurality of sets of transmission parameters for single frequency network transmissions associated with the first sounding reference signal resource;
transmit second control signaling scheduling a sounding reference signal associated with the first sounding reference signal resource, the second control signaling indicating a first set of transmission parameters and a second set of transmission parameters from the plurality of sets of transmission parameters indicated by the single frequency network configuration;
receive, from the UE, the sounding reference signal associated with the first sounding reference signal resource in accordance with the first set of transmission parameters indicated by the single frequency network configuration and based at least in part on transmitting the second control signaling; and
receive, from the UE, the sounding reference signal associated with the first sounding reference signal resource in accordance with the second set of transmission parameters indicated by the single frequency network configuration and based at least in part on transmitting the second control signaling.

15. The apparatus of claim 14, wherein the single frequency network configuration is associated with a plurality of sounding reference signal resources of the sounding reference signal resource set, the plurality of sounding reference signal resources including the first sounding reference signal resource, and the instructions are further executable by the one or more processors to cause the apparatus to:
receive a second sounding reference signal associated with a second sounding reference signal resource of the plurality of sounding reference signal resources in accordance with the first set of transmission parameters of the plurality of sets of transmission parameters based at least in part on the single frequency network configuration; and
receive the second sounding reference signal associated with the second sounding reference signal resource in accordance with the second set of transmission parameters of the plurality of sets of transmission parameters based at least in part on the single frequency network configuration.

16. The apparatus of claim 14, wherein the sounding reference signal resource set comprises at least the first sounding reference signal resource and a second sounding reference signal resource, wherein the single frequency network configuration is not associated with the second sounding reference signal resource, and the instructions are further executable by the one or more processors to cause the apparatus to:
receive a second sounding reference signal associated with the second sounding reference signal resource in accordance with one of the first set of transmission parameters or the second set of transmission parameters.

17. The apparatus of claim 14, wherein the instructions are further executable by the one or more processors to cause the apparatus to:
transmit, via the first control signaling, an indication of one or more channel state information reference signal resources associated with the sounding reference signal resource set, wherein receiving the sounding reference signal is based at least in part on the one or more channel state information reference signal resources.

18. The apparatus of claim 17, wherein the instructions are further executable by the one or more processors to cause the apparatus to:
receive the sounding reference signal in accordance with a first precoder that is based at least in part on the one or more channel state information reference signal resources, wherein the first set of transmission parameters comprise the first precoder; and
receive the sounding reference signal in accordance with a second precoder that is based at least in part on the one or more channel state information reference signal resources, wherein the second set of transmission parameters comprise the second precoder.

19. The apparatus of claim 14, wherein the instructions are further executable by the one or more processors to cause the apparatus to:
transmit, via the second control signaling, an indication of a first transmission configuration indicator state and a second transmission configuration indicator state, wherein the first set of transmission parameters comprises the first transmission configuration indicator state, and wherein the second set of transmission parameters comprises the second transmission configuration indicator state.

20. The apparatus of claim 14, wherein the instructions are further executable by the one or more processors to cause the apparatus to:
transmit, to the UE based at least in part on the sounding reference signal, the second control signaling, the second control signaling scheduling an uplink message associated with the first sounding reference signal resource;
receive the uplink message in accordance with the first set of transmission parameters based at least in part on the second control signaling and the single frequency network configuration; and
receive the uplink message in accordance with the second set of transmission parameters based at least in part on the second control signaling and the single frequency network configuration.

21. The apparatus of claim 20, wherein the instructions are further executable by the one or more processors to cause the apparatus to:
receive the uplink message via a first antenna panel in accordance with the first set of transmission parameters; and
receive the uplink message via a second antenna panel in accordance with the second set of transmission parameters.

22. The apparatus of claim 20, wherein the instructions are further executable by the one or more processors to cause the apparatus to:

transmit, via the second control signaling, a sounding reference signal resource indicator associated with the first sounding reference signal resource, wherein receiving the uplink message is based at least in part on the sounding reference signal resource indicator.

23. The apparatus of claim 20, wherein the instructions are further executable by the one or more processors to cause the apparatus to:
transmit, via the second control signaling, a transmit precoding matrix indicator associated with the uplink message, wherein the uplink message is received in accordance with the transmit precoding matrix indicator.

24. The apparatus of claim 14, wherein the instructions are further executable by the one or more processors to cause the apparatus to:
receive the sounding reference signal in accordance with the first set of transmission parameters via a first transmission reception point; and
receive the sounding reference signal in accordance with the second set of transmission parameters via a second transmission reception point.

25. The apparatus of claim 14, wherein the first set of transmission parameters, the second set of transmission parameters, or both, comprise a transmit beam, a transmission configuration indicator state, a precoder, a power control parameter, or any combination thereof.

26. A method for wireless communication at a user equipment (UE), comprising:
receiving, from a network entity, first control signaling indicating a single frequency network configuration associated with a first sounding reference signal resource of a sounding reference signal resource set, the single frequency network configuration indicating a plurality of sets of transmission parameters for single frequency network transmissions associated with the first sounding reference signal resource;
receiving second control signaling scheduling a sounding reference signal associated with the first sounding reference signal resource, the second control signaling indicating a first set of transmission parameters and a second set of transmission parameters from the plurality of sets of transmission parameters indicated by the single frequency network configuration;
transmitting the sounding reference signal associated with the first sounding reference signal resource in accordance with the first set of transmission parameters indicated by the single frequency network configuration and based at least in part on receiving the second control signaling; and
transmitting the sounding reference signal associated with the first sounding reference signal resource in accordance with the second set of transmission parameters indicated by the single frequency network configuration and based at least in part on receiving the second control signaling.

27. The method of claim 26, wherein the single frequency network configuration is associated with a plurality of sounding reference signal resources of the sounding reference signal resource set, the plurality of sounding reference signal resources including the first sounding reference signal resource, the method further comprising:
transmitting a second sounding reference signal associated with a second sounding reference signal resource of the plurality of sounding reference signal resources in accordance with the first set of transmission parameters of the plurality of sets of transmission parameters based at least in part on the single frequency network configuration; and
transmitting the second sounding reference signal associated with the second sounding reference signal resource in accordance with the second set of transmission parameters of the plurality of sets of transmission parameters based at least in part on the single frequency network configuration.

28. A method for wireless communication at a network entity, comprising:
transmitting, to a user equipment (UE), first control signaling indicating a single frequency network configuration associated with a first sounding reference signal resource of a sounding reference signal resource set, the single frequency network configuration indicating a plurality of sets of transmission parameters for single frequency network transmissions associated with the first sounding reference signal resource;
transmitting second control signaling scheduling a sounding reference signal associated with the first sounding reference signal resource, the second control signaling indicating a first set of transmission parameters and a second set of transmission parameters from the plurality of sets of transmission parameters indicated by the single frequency network configuration;
receiving, from the UE, the sounding reference signal associated with the first sounding reference signal resource in accordance with the first set of transmission parameters indicated by the single frequency network configuration and based at least in part on transmitting the second control signaling; and
receiving, from the UE, the sounding reference signal associated with the first sounding reference signal resource in accordance with the second set of transmission parameters indicated by the single frequency network configuration and based at least in part on transmitting the second control signaling.

* * * * *